United States Patent
Abad

(10) Patent No.: US 9,487,892 B2
(45) Date of Patent: Nov. 8, 2016

(54) TIRE HAVING A COMPOSITE CORD IN THE TREAD

(75) Inventor: Vincent Abad, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 415 days.

(21) Appl. No.: 14/118,298

(22) PCT Filed: May 15, 2012

(86) PCT No.: PCT/EP2012/059025
§ 371 (c)(1),
(2), (4) Date: Dec. 10, 2013

(87) PCT Pub. No.: WO2012/156404
PCT Pub. Date: Nov. 22, 2012

(65) Prior Publication Data
US 2014/0090548 A1 Apr. 3, 2014

(30) Foreign Application Priority Data
May 18, 2011 (FR) ..................... 11 54338

(51) Int. Cl.
*D04C 1/12* (2006.01)
*B29D 30/52* (2006.01)
*B60C 9/18* (2006.01)
(Continued)

(52) U.S. Cl.
CPC ................ *D04C 1/12* (2013.01); *B29D 30/52* (2013.01); *B60C 9/0042* (2013.04); *B60C 9/18* (2013.01); *B60C 11/02* (2013.01); *B60C 11/14* (2013.01); *C08K 3/36* (2013.01); *D02G 3/48* (2013.01); *B29D 2030/381* (2013.01); *C08K 3/04* (2013.01); *C08K 7/02* (2013.01); *Y02T 10/862* (2013.01)

(58) Field of Classification Search
CPC ......... D04C 1/12; D02G 3/48; B60C 9/0042
See application file for complete search history.

(56) References Cited

U.S. PATENT DOCUMENTS 1,400,301 A    12/1921   McClurg
2,148,343 A     2/1939   Flautt ........................... 152/210
(Continued)

FOREIGN PATENT DOCUMENTS

EP    1 392 497       3/2004
JP    63-45039 A      2/1988
(Continued)

OTHER PUBLICATIONS

Z. Fodor et al., "Polyisobutylene-containing block polymers by sequential monomer addition", Polymer Bulletin, vol. 29 (6), 1992, pp. 697-704.
(Continued)

*Primary Examiner* — Shaun R Hurley
(74) *Attorney, Agent, or Firm* — Fitzpatrick, Cella, Harper & Scinto

(57) ABSTRACT

A tire includes a tread with an internal cavity. Positioned in the internal cavity is a composite cord structured to include an elastomer core and a sheath surrounding the elastomer core. The sheath is formed of a hollow cylindrical braid made of helically intertwined non-contiguous fibers. The tire may be pneumatic or non-pneumatic.

28 Claims, 5 Drawing Sheets

(51) Int. Cl.
*B60C 11/02* (2006.01)
*D02G 3/48* (2006.01)
*B60C 11/14* (2006.01)
*C08K 3/36* (2006.01)
*B60C 9/00* (2006.01)
*B29D 30/38* (2006.01)
*C08K 3/04* (2006.01)
*C08K 7/02* (2006.01)

(56) References Cited

U.S. PATENT DOCUMENTS

| | | | |
|---|---|---|---|
| 2,257,646 A | | 9/1941 | Pierce |
| 2,468,304 A | * | 4/1949 | Musselman ........... B60C 9/0042 442/168 |
| 2,960,138 A | | 11/1960 | Chiodo .......................... 152/209 |
| 3,752,206 A | * | 8/1973 | Hough ...................... B60C 9/20 152/451 |
| 3,951,719 A | * | 4/1976 | Hough ................... B29D 30/08 152/153 |
| 4,887,655 A | * | 12/1989 | Imai ...................... B60C 9/2009 152/531 |
| 4,946,899 A | | 8/1990 | Kennedy et al. ............. 525/244 |
| 5,259,822 A | * | 11/1993 | Nakanishi ............... B29C 70/16 474/205 |
| 5,268,221 A | * | 12/1993 | Nakanishi ............... B29C 70/16 152/556 |
| 5,957,434 A | | 9/1999 | Nilsson ............................ 256/10 |
| 6,003,576 A | | 12/1999 | Auxerre et al. ......... 152/209.18 |
| 6,526,859 B1 | * | 3/2003 | Ozawa .................. B29C 47/023 57/3 |
| 6,774,255 B1 | | 8/2004 | Tardivat et al. .............. 556/427 |
| 7,199,175 B2 | | 4/2007 | Vasseur .......................... 524/492 |
| 7,208,110 B2 | | 4/2007 | Lopez et al. ................... 264/139 |
| 7,217,751 B2 | | 5/2007 | Durel et al. ................... 524/262 |
| 7,250,463 B2 | | 7/2007 | Durel et al. ................... 524/492 |
| 7,300,970 B2 | | 11/2007 | Durel et al. ................... 524/493 |
| 7,488,768 B2 | | 2/2009 | Tardivat et al. .............. 524/262 |
| 7,491,767 B2 | | 2/2009 | Durel et al. ................... 524/493 |
| 7,820,771 B2 | | 10/2010 | Lapra et al. ................... 525/479 |
| 7,825,183 B2 | | 11/2010 | Robert et al. ................. 524/476 |
| 7,834,074 B2 | | 11/2010 | Brunelet et al. .............. 524/318 |
| 7,882,874 B2 | | 2/2011 | Robert et al. ............... 152/209.1 |
| 7,900,667 B2 | | 3/2011 | Vasseur ...................... 152/209.1 |
| 8,324,310 B2 | | 12/2012 | Robert et al. ................. 524/518 |
| 8,492,475 B2 | | 7/2013 | Araujo Da Silva et al. . 524/552 |
| 2007/0144641 A1 | | 6/2007 | Nguyen et al. ............ 152/209.1 |
| 2007/0169458 A1 | * | 7/2007 | Schwung ................. D02G 3/38 57/210 |
| 2009/0186961 A1 | | 7/2009 | Araujo Da Silva et al. . 523/150 |
| 2009/0209709 A1 | | 8/2009 | Araujo Da Silva et al. ......................... 525/333.1 |
| 2009/0234066 A1 | | 9/2009 | Araujo Da Silva et al. . 524/571 |
| 2009/0270558 A1 | | 10/2009 | Gandon-Pain et al. ...... 525/190 |
| 2013/0174952 A1 | | 7/2013 | Abad et al. ................ 152/209.1 |

FOREIGN PATENT DOCUMENTS

| | | |
|---|---|---|
| JP | 2004-339631 A | 12/2004 |
| JP | 2007-168438 A | 7/2007 |
| WO | 97/36724 | 10/1997 |
| WO | 99/16600 | 4/1999 |
| WO | 02/10269 A2 | 2/2002 |
| WO | 02/30939 A1 | 4/2002 |
| WO | 02/31041 A1 | 4/2002 |
| WO | 02/083782 A1 | 10/2002 |
| WO | 03/002648 A1 | 1/2003 |
| WO | 03/002649 A1 | 1/2003 |
| WO | 03/016387 A1 | 2/2003 |
| WO | 2005/087859 A1 | 9/2005 |
| WO | 2006/061064 A1 | 6/2006 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2007/017060 A1 | 2/2007 |
| WO | WO 2011/141669 A1 | 11/2011 |

OTHER PUBLICATIONS

J.E. Puskas et al., "Polyisobutylene-Containing Block Polymers by Sequential Monomer Addition. IV. New Triblock Thermopolastic Elastomers Comprising High Tg Styrenic Glassy Segments: Synthesis, Characterization and Physical Properties", Journal of Polymer Science: Part A: Polymer Chemistry, vol. 30, 1992, pp. 41-48.
G. Kaszas et al., "New Thermoplastic Elastomers of Rubbery Polyisobutylene and Glassy Cyclopolyisoprene Segments", Journal of Applied Polymer Science, vol. 39, 1990, pp. 119-144.
J.E. Puskas et al., "New Transparent Flexible UV-Cured Films from Polyisobutylene-Polyisoprene Block Polymers", Journal of Macromolecular Science-Chemistry, vol. A28(1), 1991, pp. 65-80.
J.P. Kennedy et al., "Polyisobutylene—Containing Block Copolymers by Sequential Monomer Addition. 5 Synthesis, Characterization, and Select Properties of Poly (p-tert-butylstyrene-b-isobutylene-b-p-tert-butylstyrene)", Macromolecules, 1991, 24, 6572-6577.

* cited by examiner

TIRE HAVING A COMPOSITE CORD IN THE TREAD

FIELD OF THE INVENTION

The present invention relates to pneumatic tires and more particularly to a pneumatic tire, the tread of which incorporates a regrooving composite cord.

STATE OF THE ART

In the vast majority of cases, the tread patterns for pneumatic tires for heavy duty vehicles are provided with straight, zigzag or wavy circumferential grooves, it being possible for the said grooves to be joined via transverse grooves and/or incisions. The circumferential grooves generally comprise wear indicators, which are small platforms of vulcanized rubber mixture covering the bottom of these grooves over a certain circumferential length, the indicator indicating the minimum depth of pattern which legally has to remain on the tread in use. Patterns for heavy duty vehicles are regroovable (operation by which fresh grooves can be hollowed out again) and the pneumatic tires having such patterns carry, on their side walls, the wording "Regroovable" or the symbol "U". The regrooving makes it possible, on the one hand, to extend the grip potential of the heavy duty vehicle pneumatic tire and, on the other hand, to significantly increase the tire life (expressed in kilometers): by 15% to 30%, as the case may be, this being achieved without damaging the possibility of retreading, which is furthermore an essential characteristic of a heavy duty vehicle pneumatic tire. It is necessary to add that the regrooving can also make possible a saving in fuel, the pneumatic tire exhibiting a lower rolling resistance as a result of the reduced depth of the grooves in the initial state in comparison with those of a pneumatic tire having, in the fresh state, a total pattern depth corresponding to the maximum regrooving depth.

As known per se, the regrooving of a groove can be carried out using a rounded heated blade, more often handled by an operator. The said blade, connected to a frame which is supported on the tread surface, can be used manually so as to fairly reliably follow the line of the groove on the surface of the tread, even in the case of a groove not following a straight line. However, this regrooving operation requires a number of precautions. The first of them consists in carrying out the regrooving operation when approximately 2 mm of depth of groove remain, the said depth being measured between the tread surface and the radially outer surface of the wear indicators placed at the groove bottom. This precaution makes it possible to easily visualize the pattern design and thus to reproduce it without major difficulty. Knowing the remaining pattern depth and the regrooving depth recommended by the pneumatic tire manufacturer, it is then possible to adjust and set the height of the regrooving blade.

The regrooving depths generally indicated are theoretical depths. While they are, in the majority of cases, satisfactory and make it possible to theoretically set the blade height in order to obtain approximately a certain thickness of rubber between the regrooved groove bottom and the radially upper face of the crown reinforcement, the risks of excessively deep regrooving are not ruled out. In point of fact, an excessively forceful regrooving can cause damage resulting in the premature destruction of the tire casing. It can also compromise the possibility of an economical retreading, that is to say a retreading where only the tread is changed. It can also, in some extreme cases, reveal, at the bottom of the new grooves after regrooving, the plies of the radially underlying crown reinforcement, which is not generally allowed by the legislation in force.

In order to make it possible to carry out a regrooving which accurately keeps to the presence of a minimum thickness of rubber, above the radially outer face of the crown reinforcement, set by the pneumatic tire manufacturer, while making it possible to increase the tire life (expressed in kilometers) as much as possible, U.S. Pat. No. 6,003,576 recommends, in a pneumatic tire comprising a radial carcass reinforcement radially surmounted by a crown reinforcement formed of at least one ply of reinforcing elements, and a tread provided with grooves which can be regrooved, providing the tread parts positioned radially under the regroovable grooves with depth indicators, each indicator comprising at least one means indicating the minimum depth to be reached for effective regrooving and the maximum depth which must under no circumstances be exceeded.

The depth indicators are preferably provided in the form of incisions having a small but non zero width placed at the groove bottom, either parallel to the direction of the said groove, or perpendicular to the said direction, or both simultaneously, the means indicating the minimum and maximum depths then being the geometric shape of the bottom of the depth-indicating incision.

Although having resulted in enormous progress in the art and the way of regrooving a tread, the regrooving indicators do not remove, despite automation and extensive mechanization, the risk of passage of a cutting blade very close to the plies of the crown reinforcement; these indicators do not eliminate the human presence for the depth adjustments. Furthermore, the regrooving is carried out radially under the original grooves, designed according to a new tread thickness, and not according to a tread, the thickness of which has greatly decreased and the optimum pattern design of which is not necessarily the design conceived for the normal tread thickness.

Provision has also been made (U.S. Pat. No. 2,148,343) to incorporate, in the tread of the new pneumatic tire, a plurality of cords positioned inside the said tread in the longitudinal direction. As soon as the wear of the tread reaches the cords, the latter are ejected by the centrifugal force and new grooves are thus formed.

The document EP 1 392 497 B1 provides a tread internally comprising interlayers, the external wall of which, seen in meridional cross section, has in part an outline identical to the outline of the wall of a regrooving groove to be created. The interlayers have the property of being non-sticking with the rubber mixture of the tread. These interlayers are provided with orifices in order to create, during the molding of the blank of the pneumatic tire, bridges of rubber mixture between the material of the regrooving groove to be created and the remainder of the tread. These rubber bridges prevent the ejection of the material of the regrooving groove to be created when it comes into contact with the ground by wear of the tread, while allowing it to be extracted by an operator by breaking these bridges made of rubber mixture.

However, the process for the manufacture of this tread is lengthy, complex and expensive since it is necessary in particular to successively place, in the tread blank, the interlayers and then the regrooving cords.

In that which follows, the term "cord" or "string" is understood to mean a product having an essentially constant cross section and having a length which is much greater than any other dimension and the term "regrooving cord" is understood to mean a cord intended to be inserted in an internal cavity of a tread of a pneumatic or non-pneumatic tire during manufacture and then to be withdrawn after wear of the tread in service in order to create a circumferential regrooving groove. The regrooving cord, after insertion in the tread, forms a continuous circumferential ring. This ring can be straight, zigzag or wavy, as the case may be.

BRIEF DESCRIPTION OF THE INVENTION

A subject-matter of the invention is a pneumatic or non-pneumatic tire with a tread, characterized in that the tread comprises, in at least one internal cavity, a composite cord comprising an elastomer core and a sheath surrounding the elastomer core and in that the sheath is a hollow cylindrical braid made of helically intertwined non-contiguous fibers.

The braid of the sheath is, for example, formed of two series of crisscrossed fibers, positioned at an angle with respect to the generatrix of the sheath. Spacings remain between the non-contiguous fibers and give the braid of the sheath great deformability, in particular of the diameter of the sheath as a function of the extension of the latter in the direction of its generatrix. These spacings also have the advantage of making it possible, during the vulcanization of the pneumatic tire in a mold, direct contact between the elastomer core of the cord positioned in a cavity of the tread of the pneumatic tire and the adjacent mixture of the tread and thus the creation of rubber bridges providing a dense and homogenous mechanical bond of the composite cord over the whole of its periphery.

The composite cord can be produced by injection of the elastomer core into the braid and can subsequently be easily incorporated in a cavity of a tread, before the vulcanization of the pneumatic tire. According to an alternative form, it is also possible to braid a sheath directly around an existing elastomer core.

The braid also has the advantage of surrounding the elastomer core during the vulcanization of the pneumatic tire and thus of facilitating the maintenance of the geometry of this elastomer core throughout the vulcanization phase.

The mechanical bond of the composite cord with the adjacent material of the tread is sufficient for it not to be ejected during running and to prevent any relative movement of this composite cord with regard to the remainder of the tread, which movement is the source of frictional actions and thus of heat dissipation at the interface.

The rubber bridges also exhibit the advantage of being able to be manually torn out without specific tooling once the composite cord is visible by wear of the tread of the pneumatic tire and thus of making possible easy and precise extraction of the composite cord while keeping intact the elastomer core. The extraction of the composite cord results in the appearance of a groove similar to a regrooving groove in the pattern of the tread. The braid can be colored in order to facilitate detection of the level of wear appropriate for the extraction of the composite cord.

According to a first embodiment, the formulation of the elastomer core of the composite cord is based on at least one diene elastomer. Preferably, this composition comprises more than 30 parts by weight per hundred parts of elastomer (phr) of a filler denoted A, the particles of which are nanoparticles having an average size of less than 500 μm.

According to another embodiment, the elastomer core of the composite cord is based on at least one thermoplastic elastomer, the thermoplastic elastomer being a block copolymer comprising at least one unsaturated elastomer block and at least one thermoplastic block.

The cords according to one embodiment of the invention are such that their greatest dimension in any cross section is between 3 and 20 mm and preferably between 5 and 15 mm.

These cord dimensions make it possible to create, after they have been removed from the tread, grooves or furrows with an axial width of between 3 and 15 mm, which gives back to the pattern of the tire an excellent ability to discharge water when running on wet ground.

Below 3 mm, the efficiency of the cords is no longer sufficient and, above 15 mm, the gain introduced is no longer substantial.

The cross section of the composite cord can be of any shape, in particular substantially circular, or square, or rectangular or U-shaped.

The invention relates in particular to the pneumatic tires intended to equip industrial vehicles chosen from vans, "heavy-duty vehicles"—that is to say, underground, bus, heavy road transport vehicles (trucks, tractors, trailers) or off-road vehicles, such as agricultural vehicles or civil engineering equipment—or other transportation or handling vehicles. The invention can also apply to the pneumatic tires of passenger motor vehicles, SUVs (Sport Utility Vehicles), two-wheel vehicles (in particular motorcycles), aircraft, and the like.

The composite cords according to the invention can be used for pneumatic tires, that is to say tires inflated with air, but also for non-pneumatic tires, that is to say tires for which the load bearing is provided structurally and non-pneumatically.

DETAILED DESCRIPTION OF THE INVENTION

In the present description, unless expressly indicated otherwise, all the percentages (%) shown are percentages by weight.

Furthermore, any interval of value denoted by the expression "between a and b" represents the range of values extending from more than a to less than b (that is to say, limits a and b excluded), whereas any interval of value denoted by the expression "from a to b" means the range of values extending from a up to b (that is to say, including the strict limits a and b).

The term "phr" is understood to mean: parts by weight per hundred parts of elastomer.

The expression "composition based on" is understood to mean a composition comprising the mixture and/or the reaction product of the various constituents used, some of these base constituents being capable of reacting or intended to react with one another, at least in part, during the various phases of manufacture of the composition, in particular during the manufacture and the crosslinking or vulcanization thereof.

Measurements and Tests Used

Characterization of the Fillers

The (weight-)average size of the nanoparticles, denoted $d_w$, is measured conventionally after dispersion, by deagglomeration with ultrasound, of the filler to be analyzed in water or an aqueous solution comprising a surfactant.

For an inorganic filler, such as silica, the measurement is carried out using an XDC (X-rays Disc Centrifuge) X-ray detection centrifugal sedimentometer, sold by Brookhaven Instruments, according to the following procedure. A suspension of 3.2 g of sample of inorganic filler to be analyzed in 40 ml of water is produced by the action, lasting 8 minutes, at 60% power (60% of the maximum position of the "output control"), of a 1500 W ultrasound probe (Vibracell ¾ inch sonicator, sold by Bioblock); after sonication, 15 ml of the suspension are introduced into the rotating disc; after sedimentation for 120 minutes, the weight distribution of the particle sizes and the weight-average size of the particles $d_w$ are calculated by the XDC sedimentometer software ($d_w=\Sigma(n_i \times d_i^5)/\Sigma(n_i \times d_i^4)$) with $n_i$ the number of objects of the size or diameter class $d_i$).

For carbon black, the procedure was carried out with an aqueous solution comprising 15% of ethanol and 0.05% of a nonionic surfactant (% by volume). The determination is carried out using a centrifugal photosedimentometer of DCP type (Disc Centrifuge Photosedimentometer, sold by Brookhaven Instruments). A suspension of 10 mg of carbon black is prepared beforehand in 40 ml of an aqueous solution comprising 15% of ethanol and 0.05% of a nonionic surfactant (% by volume) by the action, lasting 10 minutes, at 60% power (i.e., 60% of the maximum position of the "tip amplitude"), of a 600 W ultrasound probe (Vibracell ½ inch sonicator, sold by Bioblock). During the sonication, a gradient composed of 15 ml of water (comprising 0.05% of a nonionic surfactant) and 1 ml of ethanol is injected into the rotating disc of the sedimentometer at 8000 revolutions/min, in order to form a "step gradient". Subsequently, 0.3 ml of the carbon black suspension is injected at the surface of the gradient; after sedimentation lasting 120 min, the weight distribution of the particle sizes and the weight-average size $d_w$ are calculated by the sedimentometer software, as indicated above.

Sheath

A first essential characteristic of the composite cord according to the invention is to comprise a sheath consisting of a hollow cylindrical braid made of helically intertwined non-contiguous fibers. This sheath surrounds the elastomer core of the composite cord. The braid is, for example, formed of two series of crisscross fibers, positioned at an angle with respect to the generatrix of the braid. As shown in FIG. 17, each series includes a plurality of fibers 85 arranged parallel to one another in a "non-contiguous" or non-touching manner such that the fibers define, between them, spacings 87, which, when the two series of fibers are crisscrossed with each other, give the braid great deformability, in particular of the diameter of the braid as a function of the extension of the latter in the direction of its generatrix. As shown in FIG. 17, an elastomer core 83 may be seen through the spacings 87 formed by the two series of non-contiguous or non-touching fibers.

These spacings also have the advantage of making it possible, during the vulcanization of the cord in a cavity of a pneumatic tire tread, direct contact between the elastomer core of the composite cord and the adjacent mixture of the tread and thus the creation of rubber bridges ensuring dense and homogeneous mechanical anchoring of the cord over the whole of its periphery.

Preferably, the geometry of the fibers of the braid and their assembling are such that the surface area of the spacings is between 5% and 30% of the surface area of the braid. Below 5%, the number of rubber bridges becomes insufficient to ensure good anchoring of the cord in the tread and, above 30%, it becomes difficult to extract the regrooving cord from the tread without a specific tool. Very preferably, the surface area of the spacings is between 10% and 20% of the surface area of the braid.

These braids have an extensible diameter. They are usually braided from thermoplastic monofilaments having a round or flat section.

Preferably, the fibers of the braid are selected from the group consisting of polyamides, polyesters, polysulphones, poly(phenylene sulphide)s, poly(ether-ketone)s, polyetherimides, poly(amide-imide)s, polyimides, thermoplastic elastomers, their mixtures and their alloys.

The polyamides can be selected from the group of the aliphatic polyamides, such as polyamides 6, polyamides 6,6, and their mixtures.

The polyamides can also be selected from the group of the semi-aromatic polyamides, such as poly(meta-xylylene adipamide)s (MXD-6), polyphthalamides, the copolyamides and their mixtures.

Preferably, the polyesters are selected from polyethylene terephthalates (PETs), polybutylene terephthalates (PBTs), polycarbonates (PCs) and polyethylene naphthoates (PENs) and their mixtures.

The choice may also advantageously be made, as fibers for forming the braid, of fibers of thermoplastic elastomers selected from the group of the poly(ether-block-amide)s (PEBAs), thermoplastic polyurethanes (TPUs), ether-ester copolymers (COPEs), and their mixtures.

Preferably, the ether-ester copolymers (COPEs) are selected from polyester-ethers and polyester-esters.

Such extensible braids are well known and are commercially available. By way of example, Gremco sells expandable braided tubular braids manufactured from polyamide 6,6 monofilaments under the Gremflex® PA6.6 brand. Observation using a binocular microscope makes it possible to easily determine the mean surface area of spacings for a given surface area of the braid. This mean value is of the order of 15% in this individual case (see FIG. 17). Gremco also sells, among many others, similar braids manufactured from PBT polyester monofilaments under the Gremflex® FR brand.

Elastomer Core

A second essential characteristic of the composite cord according to the invention is to comprise an elastomer core.

According to a first embodiment, the composition of this elastomer core is based on a diene elastomer. Preferably, the composition comprises more than 30 phr of a filler denoted A, the particles of which are nanoparticles having a weight-average size of less than 500 nm.

Diene Elastomer

The term "diene elastomer" or "diene rubber" should be understood as meaning, in a known way, an (one or more is understood) elastomer resulting at least in part (i.e., a homopolymer or a copolymer) from diene monomers (monomers bearing two conjugated or non-conjugated carbon-carbon double bonds).

The diene elastomer of the elastomer core is preferably selected from the group of the highly unsaturated diene elastomers consisting of polybutadienes (BRs), synthetic polyisoprenes (IRs), natural rubber (NR), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs) and isoprene/butadiene/styrene copolymers (SBIRs).

Suitable in particular are polybutadienes having a content (molar %) of 1,2-units of between 4% and 80% or those having a content (molar %) of cis-1,4-units of greater to than 80%, polyisoprenes, butadiene/styrene copolymers and in particular those having a Tg (glass transition temperature, measured according to ASTM D3418) between 0° C. and −70° C. and more particularly between −10° C. and −60° C., a styrene content of between 5% and 60% by weight and more particularly between 20% and 50%, a content (molar %) of 1,2-bonds of the butadiene part of between 4% and 75% and a content (molar %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between −25° C. and −50° C.

In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (molar %) of 1,2-units of the butadiene part of between 4% and 85%, a content (molar %) of trans-1,4-units of the butadiene part of between 6% and 80%, a content (molar %) of 1,2-plus 3,4-units of the isoprene part of between 5% and 70% and a content (molar %) of trans-1,4-units of the isoprene part of between 10% and 50%, and more generally any butadiene/styrene/isoprene copolymer having a Tg of between −20° C. and −70° C., are suitable in particular.

According to a specific embodiment, the diene elastomer is predominantly (i.e., for more than 50 phr) an SBR, whether an SBR prepared in emulsion ("ESBR") or an SBR prepared in solution ("SSBR"), or an SBR/BR, SBR/NR (or SBR/IR), BR/NR (or BR/IR) or also SBR/BR/NR (or SBR/BR/IR) blend (mixture). In the case of an SBR (ESBR or SSBR) elastomer, use is made in particular of an SBR having a moderate styrene content, for example of between 20% and 35% by weight, or a high styrene content, for example from 35% to 45%, a content of vinyl bonds of the butadiene part of between 15% and 70%, a content (molar %) of trans-1,4-bonds of between 15% and 75% and a Tg of between −10° C. and −55° C.; such an SBR can advantageously be used as a mixture with a BR preferably having more than 90% (molar %) of cis-1,4-bonds.

According to another specific embodiment, the diene elastomer is predominantly (for more than 50 phr) an isoprene elastomer. The term "isoprene elastomer" is understood to mean, in a known way, an isoprene homopolymer or copolymer, in other words a diene elastomer selected from the group consisting of natural rubber (NR), synthetic polyisoprenes (IRs), the various copolymers of isoprene and the mixtures of these elastomers. Mention will in particular be made, among the isoprene copolymers, of isobutene/isoprene copolymers (butyl rubber-IIR), isoprene/styrene copolymers (SIRs), isoprene/butadiene copolymers (BIRs) or isoprene/butadiene/styrene copolymers (SBIRs). This isoprene elastomer is preferably natural rubber or a synthetic cis-1,4-polyisoprene; use is preferably made, among these synthetic polyisoprenes, of the polyisoprenes having a content (molar %) of cis-1,4-bonds of greater than 90%, more preferably still of greater than 98%.

According to another preferred embodiment of the invention, the elastomer core comprises a blend of a (one or more) "high Tg" diene elastomer exhibiting a Tg of between −70° C. and 0° C. and of a (one or more) "low Tg" diene elastomer exhibiting a Tg of between −110° C. and −80° C., more preferably between −105° C. and −90° C. The high Tg elastomer is preferably selected from the group consisting of S-SBRs, E-SBRs, natural rubber, synthetic polyisoprenes (exhibiting a content (molar %) of cis-1,4-enchainments preferably of greater than 95%), BIRs, SIRs, SBIRs and the mixtures of these elastomers. The low Tg elastomer preferably comprises butadiene units according to a content (molar %) at least equal to 70%; it preferably consists of a polybutadiene (BR) exhibiting a content (molar %) of cis-1,4-enchainments of greater than 90%.

According to another specific embodiment of the invention, the composition of the elastomer core comprises, for example, from 30 to 100 phr, in particular from 50 to 100 phr, of a high Tg elastomer as a blend with 0 to 70 phr, in particular from 0 to 50 phr, of a low Tg elastomer; according to another example, it comprises, for the whole of the 100 phr, one or more SBR(s) prepared in solution.

According to another specific embodiment of the invention, the diene elastomer of the composition of the elastomer core comprises a blend of a BR (as low Tg elastomer) exhibiting a content (molar %) of cis-1,4-enchainments of greater than 90% with one or more S-SBRs or E-SBRs (as high Tg elastomer(s)).

The compositions formulated according to the invention can comprise a single diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

Filler A

Use may be made of any type of reinforcing filler known for its abilities to reinforce a rubber composition which can be used for the manufacture of tire treads, for example an organic filler, such as carbon black, a reinforcing inorganic filler, such as silica, or also a blend of these two types of filler, in particular a blend of carbon black and silica.

All carbon blacks are suitable as carbon blacks, in particular the blacks conventionally used in the treads of tires ("tire-grade" blacks). Among the latter, mention will more particularly be made of the reinforcing carbon blacks of the 100, 200 or 300 series (ASTM grades), such as, for example, the N115, N134, N234, N326, N330, N339, N347 or N375 blacks, or also, depending on the applications targeted, the blacks of higher series (for example N660, N683 or N772). The carbon blacks might, for example, be already incorporated in the isoprene elastomer in the form of a masterbatch (see, for example, Application WO 97/36724 or WO 99/16600).

Mention may be made, as examples of organic fillers other than carbon blacks, of functionalized polyvinylaromatic organic fillers, such as described in Applications WO-A-2006/069792 and WO-A-2006/069793.

The term "reinforcing inorganic filler" should be understood as meaning, in the present patent application, by definition, any inorganic or mineral filler (whatever its colour and its origin (natural or synthetic)), also known as "white" filler, "clear" filler, indeed even "non-black" filler, in contrast to carbon black, capable of reinforcing, by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of balls or any other appropriate densified form. Of course, the term "reinforcing inorganic filler" is also understood to mean mixtures of different reinforcing inorganic fillers, in particular of highly dispersible siliceous and/or aluminous fillers as described below.

Suitable in particular as reinforcing inorganic fillers are mineral fillers of the siliceous type, in particular silica ($SiO_2$), or of the aluminous type, in particular alumina ($Al_2O_3$). The silica used can be any reinforcing silica known to a person skilled in the art, in particular any precipitated or fumed silica exhibiting a BET specific surface and a CTAB specific surface which are both less than 450 m²/g, preferably from 30 to 400 m²/g. Mention will be made, as highly dispersible precipitated silicas ("HDSs"), for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber or the silicas having a high specific surface as described in Application WO 03/16387.

The reinforcing inorganic filler used, in particular if it is silica, preferably has a BET specific surface of between 45 and 400 m²/g, more preferably of between 60 and 300 m²/g.

Preferably, for the elastomer core, the content of total reinforcing filler A (carbon black and/or reinforcing inorganic filler, such as silica) is greater than 30 phr and preferably between 40 and 100 phr; this makes it possible to provide the elastomer core of the cord with good resistance to cracking while retaining a low hysteresis.

Preferably, the (weight-)average size of the nanoparticles is between 20 and 200 nm, more preferably between 20 and 150 nm.

Use is made, in a known way, in order to couple the reinforcing inorganic filler to the diene elastomer, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "unsymmetrical" according to their specific structure, such as described, for example, in Applications WO 03/002648 (or US 2005/016651) and WO 03/002649 (or US 2005/016650).

Suitable in particular, without the definition below being limiting, are silane polysulphides known as "symmetrical", corresponding to the following general formula (I):

$$Z-A-S_x-A-Z, \text{ in which:} \tag{I}$$

x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);
Z corresponds to one of the formulae below:

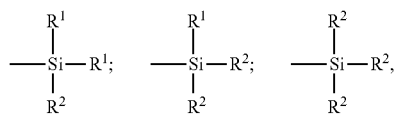

in which:
the $R^1$ radicals, which are substituted or unsubstituted and identical to or different from one another, represent a $C_1$-$C_{18}$ alkyl group, a $C_5$-$C_{18}$ cycloalkyl group or a $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);
the $R^2$ radicals, which are substituted or unsubstituted and identical to or different from one another, represent a $C_1$-$C_{18}$ alkoxyl group or a $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

Mention will more particularly be made, as examples of silane polysulphides, of bis(3-trimethoxysilylpropyl) or bis(3-triethoxysilylpropyl) polysulphides. Use is in particular made, among these compounds, of bis(3-triethoxysilylpropyl) tetrasulphide, abbreviated to TESPT, or bis(triethoxysilylpropyl) disulphide, abbreviated to TESPD. Mention will also be made, as preferred examples, of bis(mono($C_1$-$C_4$) alkoxyldi($C_1$-$C_4$)alkylsilylpropyl) polysulphides (in particular disulphides, trisulphides or tetrasulphides), more particularly bis(monoethoxydimethylsilylpropyl) tetrasulphide, such as described in Patent Application WO 02/083782 (or US 2004/132880).

Mention will in particular be made, as coupling agent other than an alkoxysilane polysulphide, of bifunctional POSs (polyorganosiloxanes) or else of hydroxysilane polysulphides ($R^2$=OH in the above formula I), such as described in Patent Applications WO 02/30939 (or U.S. Pat. No. 6,774,255) and WO 02/31041 (or US 2004/051210), or else of silanes or POSs carrying azodicarbonyl functional groups, such as described, for example, in Patent Applications WO 2006/125532, WO 2006/125533 and WO 2006/125534.

In the elastomer core compositions according to a subject-matter of the invention, the content of coupling agent is preferably between 3 and 12 phr, more preferably between 4 and 9 phr.

A person skilled in the art will understand that a reinforcing filler of another nature, in particular organic nature, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer.

Various Additives

The composition of the elastomer core can also comprise all or a portion of the usual additives generally used in elastomer compositions intended for the manufacture of tires, such as, for example, pigments, protection agents, such as antiozone waxes, chemical antiozonants or antioxidants, antifatigue agents, reinforcing resins, methylene acceptors (for example, phenolic novolac resin) or methylene donors (for example, HMT or H3M), such as described, for example, in Application WO 02/10269, a crosslinking system based either on sulphur, or on sulphur donors and/or on peroxide and/or on bismaleimides, vulcanization accelerators or vulcanization activators.

The formulation of the elastomer core can also comprise, in addition to the coupling agents, coupling activators, covering agents for the inorganic fillers or more generally processing aids capable, in a known way, by virtue of an improvement in the dispersion of the filler in the rubber matrix and of a lowering in the viscosity of the compositions, of improving their ease of processing in the raw state, these agents being, for example, hydrolysable silanes, such as alkylalkoxysilanes, polyols, polyethers, primary, secondary or tertiary amines or hydroxylated or hydrolysable polyorganosiloxanes.

The elastomer core can also comprise, as preferred non-aromatic or very weakly aromatic plasticizing agent, at least one compound selected from the group consisting of naphthenic oils, paraffinic oils, MES oils, TDAE oils, ester plasticizers (for example, glycerol trioleates), hydrocarbon resins exhibiting a high Tg preferably of greater than 30° C., such as described, for example, in Applications WO 2005/087859, WO 2006/061064 and WO 2007/017060, and the mixtures of such compounds. The overall content of such a preferred plasticizing agent is preferably between 10 and 100 phr, more preferably between 20 and 80 phr, in particular within a range from 10 to 50 phr.

Mention will in particular be made, among the above plasticizing hydrocarbon resins (it should be remembered that the name "resin" is reserved by definition for a solid compound), of α-pinene, β-pinene, dipentene, polylimonene or $C_5$ fraction homo- or copolymer resins, for example $C_5$ fraction/styrene copolymer resin or $C_5$ fraction/$C_9$ fraction copolymer resin, which can be used alone or in combination with plasticizing oils, such as, for example, MES or TDAE oils.

According to a second embodiment of the elastomer core, the composition of this elastomer core is based on at least one thermoplastic elastomer, the thermoplastic elastomer being a block copolymer comprising at least one unsaturated elastomer block and at least one thermoplastic block.

Thermoplastic Elastomer (TPE)

Thermoplastic elastomers (abbreviated to "TPEs") have a structure intermediate between thermoplastic polymers and elastomers. These are block copolymers composed of rigid thermoplastic blocks connected via flexible elastomer blocks.

The thermoplastic elastomer used for the implementation of this embodiment of the invention is a block copolymer, the chemical nature of the thermoplastic and elastomer blocks of which can vary.

Structure of the TPE

The number-average molecular weight (denoted Mn) of the TPE is preferably between 30 000 and 500 000 g/mol, more preferably between 40 000 and 400 000 g/mol. Below the minima indicated, there is a risk of the cohesion between the elastomer chains of the TPE being affected, in particular due to its possible dilution (in the presence of an extending oil); furthermore, there is a risk of an increase in the working temperature affecting the mechanical properties, in particular the properties at break, with the consequence of a reduced "hot" performance. Furthermore, an excessively high weight Mn can be damaging to the use. Thus, it has been found that a value within a range from 50 000 to 300 000 g/mol was particularly well suited, in particular to use of the TPE in a tire regrooving cord composition.

The number-average molecular weight (Mn) of the TPE elastomer is determined, in a known manner, by steric exclusion chromatography (SEC). For example, in the case of styrene thermoplastic elastomers, the sample is dissolved beforehand in tetrahydrofuran at a concentration of approximately 1 g/l and then the solution is filtered through a filter with a porosity of 0.45 μm before injection. The apparatus used is a Waters Alliance chromatographic line. The elution solvent is tetrahydrofuran, the flow rate is 0.7 ml/min, the temperature of the system is 35° C. and the analytical time is 90 min. A set of four Waters columns in series, with the Styragel tradenames (HMW7, HMW6E and two HT6E), is used. The injected volume of the solution of the polymer sample is 100 μl. The detector is a Waters 2410 differential refractometer and its associated software, for making use of the chromatographic data, is the Waters Millennium system. The calculated average molar masses are relative to a calibration curve produced with polystyrene standards. The conditions can be adjusted by a person skilled in the art.

The value of the polydispersity index PI (reminder: PI=Mw/Mn, with Mw the weight-average molecular weight and Mn the number-average molecular weight) of the TPE is preferably less than 3, more preferably less than 2 and more preferably still less than 1.5.

In the present patent application, when reference is made to the glass transition temperature of the TPE, it concerns the Tg relative to the elastomer block. The TPE preferably exhibits a glass transition temperature ("Tg") which is preferably less than or equal to 25° C., more preferably less than or equal to 10° C. A Tg value greater than these minima can reduce the performance of the elastomer core of the composite cord when used at very low temperature; for such a use, the Tg of the TPE is more preferably still less than or equal to −10° C. Preferably again, the Tg of the TPE is greater than −100° C.

In a known way, TPEs exhibit two glass transition temperature peaks (Tg, measured according to ASTM D3418), the lowest temperature being relative to the elastomer part of the TPE and the highest temperature being relative to the thermoplastic part of the TPE. Thus, the flexible blocks of the TPEs are defined by a Tg which is less than ambient temperature (25° C.), while the rigid blocks have a Tg which is greater than 80° C.

In order to be both elastomeric and thermoplastic in nature, the TPE has to be provided with blocks which are sufficiently incompatible (that is to say, different as a result of their respective weights, their respective polarities or their respective Tg values) to retain their own properties of elastomer block or thermoplastic block.

The TPEs can be copolymers with a small number of blocks (less than 5, typically 2 or 3), in which case these blocks have high weights of greater than 15 000 g/mol. These TPEs can, for example, be diblock copolymers, comprising a thermoplastic block and an elastomer block. They are often also triblock elastomers with two rigid segments connected by a flexible segment. The rigid and flexible segments can be positioned linearly, or in a star or branched configuration. Typically, each of these segments or blocks often comprises a minimum of more than 5, generally of more than 10, base units (for example, styrene units and butadiene units for a styrene/butadiene/styrene block copolymer).

The TPEs can also comprise a large number of smaller blocks (more than 30, typically from 50 to 500), in which case these blocks have relatively low weights, for example from 500 to 5000 g/mol; these TPEs will subsequently be referred to as multiblock TPEs and are an elastomer block/thermoplastic block enchainment.

According to a first alternative form, the TPE is provided in a linear form. For example, the TPE is a diblock copolymer: thermoplastic block/elastomer block. The TPE can also be a triblock copolymer: thermoplastic block/elastomer block/thermoplastic block, that is to say a central elastomer block and two terminal thermoplastic blocks, at each of the two ends of the elastomer block. Equally, the multiblock TPE can be a linear enchainment of elastomer blocks/thermoplastic blocks.

According to another alternative form of this embodiment of the invention, the TPE of use for the requirements of the invention is provided in a star-branched form comprising at least three branches. For example, the TPE can then be composed of a star-branched elastomer block comprising at least three branches and of a thermoplastic block located at the end of each of the branches of the elastomer block. The number of branches of the central elastomer can vary, for example, from 3 to 12 and preferably from 3 to 6.

According to another alternative form of this embodiment of the invention, the TPE is provided in a branched or dendrimer form. The TPE can then be composed of a branched or dendrimer elastomer block and of a thermoplastic block located at the end of the branches of the dendrimer elastomer block.

Nature of the Elastomer Blocks

The elastomer blocks of the TPEs can be any elastomer known to a person skilled in the art. They may comprise a carbon-based chain (for example polyisoprene) or may not (for example silicones). They have a Tg of less than 25° C., preferably of less than 10° C., more preferably of less than 0° C. and very preferably of less than −10° C. Preferably again, the Tg of the elastomer block of the TPE is greater than −100° C.

For the elastomer blocks comprising a carbon-based chain, if the elastomer part of the TPE does not comprise an ethylenic unsaturation, it will be referred to as a saturated elastomer block. If the elastomer block of the TPE comprises ethylenic unsaturations (that is to say, carbon-carbon double bonds), it will then be referred to as an unsaturated or diene elastomer block. In the context of this embodiment of the invention, unsaturated elastomer blocks are chosen in order to make possible a good mechanical bond with the adjacent mixtures of the tread by covulcanization. It should be noted that the covulcanization with the adjacent mixture of the tread can be carried out even if the elastomer core does not comprise an appropriate vulcanization system.

In the case of unsaturated elastomer blocks, this elastomer block of the TPE is predominantly composed of a diene elastomer part. The term "predominantly" is understood to mean the highest content by weight of diene monomer, with respect to the total weight of the elastomer block, and preferably a content by weight of more than 50%, more preferably of more than 75% and more preferably still of more than 85%. Alternatively, the unsaturation of the unsaturated elastomer block can originate from a monomer comprising a double bond and an unsaturation of cyclic type, which is the case, for example, in polynorbornene.

Preferably, conjugated $C_4$-$C_{14}$ dienes can be polymerized or copolymerized in order to form a diene elastomer block. Preferably, these conjugated dienes are chosen from isoprene, butadiene, piperylene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 2,5-dimethyl-1,3-pentadiene, 2-methyl-1,4-pentadiene, 1,3-hexadiene, 2-methyl-1,3-hexadiene, 2-methyl-1,5-hexadiene, 3-methyl-1,3-hexadiene, 4-methyl-1,3-hexadiene, 5-methyl-1,3-hexadiene, 2,5-dimethyl-1,3-hexadiene, 2,5-dimethyl-2,4-hexadiene, 2-neopentyl-1,3-butadiene, 1,3-cyclopentadiene, methylcyclopentadiene, 2-methyl-1,6-heptadiene, 1,3-cyclohexadiene, 1-vinyl-1,3-cyclohexadiene or their mixture. More preferably, the conjugated diene is isoprene or butadiene or a mixture comprising isoprene and/or butadiene.

According to an alternative form, the monomers polymerized in order to form the elastomer part of the TPE can be randomly copolymerized with at least one other monomer, so as to form an elastomer block. According to this alternative form, the molar fraction of polymerized monomer, other than an ethylenic monomer, with respect to the total number of units of the elastomer block, has to be such that this block retains its elastomer properties. Advantageously, the molar fraction of this other comonomer can range from 0% to 50%, more preferably from 0% to 45% and more preferably still from 0% to 40%.

By way of illustration, this other monomer capable of copolymerizing with the first monomer can be chosen from ethylenic monomers as defined above (for example ethylene), diene monomers, more particularly the conjugated diene monomers having from 4 to 14 carbon atoms as defined above (for example butadiene), monomers of vinylaromatic type having from 8 to 20 carbon atoms as defined above, or also a monomer such as vinyl acetate may be involved.

When the comonomer is of vinylaromatic type, it advantageously represents a fraction of units, with regard to the total number of units of the thermoplastic block, from 0% to 50%, preferably ranging from 0% to 45% and more preferably still ranging from 0% to 40%. The styrene monomers mentioned above, namely methylstyrenes, para(tert-butyl) styrene, chlorostyrenes, bromostyrenes, fluorostyrenes or also para-hydroxystyrene, are suitable in particular as vinylaromatic compounds. Preferably, the comonomer of vinylaromatic type is styrene.

According to this embodiment of the invention, the elastomer blocks of the TPE exhibit, in total, a number-average molecular weight (Mn) ranging from 25 000 g/mol to 350 000 g/mol, preferably from 35 000 g/mol to 250 000 g/mol, so as to confer, on the TPE, good elastomeric properties and a sufficient mechanical strength.

The elastomer block can also be a block comprising several types of diene or styrene monomers as defined above.

The elastomer block can also be composed of several elastomer blocks as defined above.

Nature of the Thermoplastic Blocks

Use will be made, for the definition of the thermoplastic blocks, of the characteristic of glass transition temperature (Tg) of the rigid thermoplastic block. This characteristic is well known to a person skilled in the art. It makes it possible in particular to choose the industrial processing (transformation) temperature. In the case of an amorphous polymer (or polymer block), the processing temperature is chosen to be substantially greater than the Tg. In the specific case of a semi-crystalline polymer (or polymer block), a melting point may be observed which is then greater than the glass transition temperature. In this case, it is instead the melting point (M.p.) which makes it possible to choose the processing temperature for the polymer (or polymer block) under consideration. Thus, subsequently, when reference will be made to "Tg (or M.p., if appropriate)", it will be necessary to consider that this is the temperature used to choose the processing temperature.

For the requirements of this embodiment of the invention, the TPE elastomers comprise one or more thermoplastic block(s) having a Tg (or M.p., if appropriate) of greater than or equal to 80° C. and formed from polymerized monomers. Preferably, this thermoplastic block has a Tg (or M.p., if appropriate) within a range varying from 80° C. to 250° C. Preferably, the Tg (or M.p., if appropriate) of this thermoplastic block is preferably from 80° C. to 200° C., more preferably from 80° C. to 180° C.

The proportion of the thermoplastic blocks, with respect to the TPE as defined for the implementation of this embodiment of the invention, is determined, on the one hand, by the thermoplasticity properties which the said copolymer has to exhibit. The thermoplastic blocks having a Tg (or M.p., if appropriate) of greater than or equal to 80° C. are preferably present in proportions sufficient to retain the thermoplastic nature of the elastomer according to the invention. The minimum content of thermoplastic blocks having a Tg (or M.p., if appropriate) of greater than or equal to 80° C. in the TPE can vary as a function of the conditions of use of the copolymer. On the other hand, the ability of the TPE to deform during the preparation of the pneumatic tire can also contribute to determining the proportion of the thermoplastic blocks having a Tg (or M.p., if appropriate) of greater than or equal to 80° C.

The thermoplastic blocks having a Tg (or M.p., if appropriate) of greater than or equal to 80° C. can be formed from polymerized monomers of various natures; in particular, they can constitute the following blocks or their mixtures:
  polyolefins (polyethylene, polypropylene);
  polyurethanes;
  polyamides;
  polyesters;
  polyacetals;
  polyethers (polyethylene oxide, polyphenylene ether);
  polyphenylene sulphides;
  polyfluorinated compounds (FEP, PFA, ETFE);
  polystyrenes (described in detail below);
  polycarbonates;
  polysulphones;
  polymethyl methacrylate;
  polyetherimide;
  thermoplastic copolymers, such as the acrylonitrile/butadiene/styrene (ABS) copolymer.

The thermoplastic blocks having a Tg (or M.p., if appropriate) of greater than or equal to 80° C. can also be obtained from monomers chosen from the following compounds and their mixtures:
  acenaphthylene: a person skilled in the art may refer, for example, to the paper by Z. Fodor and J. P. Kennedy, Polymer Bulletin, 1992, 29(6), 697-705;
  indene and its derivatives, such as, for example, 2-methylindene, 3-methylindene, 4-methylindene, dimethylindene, 2-phenylindene, 3-phenylindene and 4-phenylindene; a person skilled in the art may, for example, refer to the patent document U.S. Pat. No. 4,946,899, by the inventors Kennedy, Puskas, Kaszas and Hager, and to the documents by J. E. Puskas, G. Kaszas, J. P. Kennedy and W. G Hager, Journal of Polymer Science, Part A, Polymer Chemistry (1992), 30, 41, and J. P. Kennedy, N. Meguriya and B. Keszler, Macromolecules (1991), 24(25), 6572-6577;
  isoprene, then resulting in the formation of a certain number of trans-1,4-polyisoprene units and of units cyclized according to an intramolecular process; a person skilled in the art may, for example, refer to the documents by G. Kaszas, J. E. Puskas and J. P. Kennedy, Applied Polymer Science (1990), 39(1), 119-144, and J. E. Puskas, G. Kaszas and J. P. Kennedy, Macromolecular Science, Chemistry A28 (1991), 65-80.

The polystyrenes are obtained from styrene monomers. The term "styrene" monomer should be understood as meaning, in the present description, any monomer comprising styrene, unsubstituted and substituted; mention may be made, among substituted styrenes, for example, of methylstyrenes (for example, o-methylstyrene, m-methylstyrene or p-methylstyrene, α-methylstyrene, α,2-dimethylstyrene, α,4-dimethylstyrene or diphenylethylene), para-(tert-butyl)styrene, chlorostyrenes (for example, o-chlorostyrene, m-chlorostyrene, p-chlorostyrene, 2,4-dichlorostyrene, 2,6-dichlorostyrene or 2,4,6-trichlorostyrene), bromostyrenes (for example, o-bromostyrene, m-bromostyrene, p-bromostyrene, 2,4-dibromostyrene, 2,6-dibromostyrene or 2,4,6-tribromostyrene), fluorostyrenes (for example, o-fluorostyrene, m-fluorostyrene, p-fluorostyrene, 2,4-difluorostyrene, 2,6-difluorostyrene or 2,4,6-trifluorostyrene) or also para-hydroxystyrene.

According to a preferred embodiment of this embodiment of the invention, the content by weight of styrene in the TPE elastomer is between 5% and 50%. Below the minimum indicated, there is a risk of the thermoplastic nature of the elastomer being substantially reduced while, above the recommended maximum, the elasticity of the composite cord can be affected. For these reasons, the styrene content is more preferably between 10% and 40%.

According to an alternative form of this embodiment of the invention, the polymerized monomer as defined above can be copolymerized with at least one other monomer, so as to form a thermoplastic block having a Tg (or M.p., if appropriate) as defined above.

By way of illustration, this other monomer capable of copolymerizing with the polymerized monomer can be chosen from diene monomers, more particularly conjugated diene monomers having from 4 to 14 carbon atoms, and monomers of vinylaromatic type having from 8 to 20 carbon atoms, such as defined in the part relating to the elastomer block.

According to this embodiment of the invention, the thermoplastic blocks of the TPE exhibit, in total, a number-average molecular weight (Mn) ranging from 5 000 g/mol to 150 000 g/mol, so as to confer, on the TPE, good elastomeric properties and a mechanical strength which is sufficient and compatible with the use as tire regrooving cord.

The thermoplastic block can also be composed of several thermoplastic blocks as defined above.

TPE Examples

For example, the TPE is a copolymer, the elastomer part of which is unsaturated and which comprises styrene blocks and diene blocks, these diene blocks being in particular isoprene or butadiene blocks. More preferably, this TPE elastomer is selected from the following group consisting of diblock or triblock copolymers which are linear or star-branched: styrene/butadiene (SB), styrene/isoprene (SI), styrene/butadiene/isoprene (SBI), styrene/butadiene/styrene (SBS), styrene/isoprene/styrene (SIS), styrene/butadiene/isoprene/styrene (SBIS) and the mixtures of these copolymers.

For example again, the TPE is a linear or star-branched copolymer, the elastomer part of which comprises a saturated part and an unsaturated part, such as, for example, styrene/butadiene/butylene (SBB), styrene/butadiene/butylene/styrene (SBBS) or a mixture of these copolymers.

Mention may be made, as examples of commercially available TPE elastomers, of the elastomers of SIS type sold by Kuraray under the name Hybrar 5125 or sold by Kraton under the name D1161, or also the elastomers of linear SBS type sold by Polimeri Europa under the name Europrene SOLT 166 or of star-branched SBS type sold by Kraton under the name D1184. Unsatured and epoxidized TPE elastomers, such as, for example, SBS, are also known and are commercially available, for example from Daicel under the "Epofriend" name.

TPE Amount

If optional other elastomers are used in the composition, the TPE elastomer constitutes the predominant elastomer by weight; it then represents at least 50% by weight, preferably at least 70% by weight and more preferably at least 75% by weight of the combined elastomers present in the composition of the elastomer core. Preferably again, the TPE elastomer represents at least 95% (in particular 100%) by weight of the combined elastomers present in the composition of the elastomer core.

Thus, the amount of TPE elastomer is within a range which varies from 50 to 100 phr, preferably from 70 to 100 phr and in particular from 75 to 100 phr. Preferably again, the composition comprises from 95 to 100 phr of TPE elastomer. The TPE elastomer or elastomers are preferably the only elastomer or elastomers of the elastomer core of the composite cord.

Non-Thermoplastic Elastomer

In this second embodiment of an elastomer core according to the invention based on a thermoplastic elastomer, the thermoplastic elastomer described above is sufficient by itself alone for the composite cord according to the invention to be usable.

The composition of the composite cord according to this embodiment of the invention can comprise at least one (that is to say, one or more) diene rubber as non-thermoplastic elastomer, it being possible for this diene rubber to be used alone or as a blend with at least one (that is to say, one or more) other non-thermoplastic rubber or elastomer.

The content of non-thermoplastic elastomer is within a range varying from 0 to less than 50 phr, preferably from 0 to less than 30 phr, more preferably from 0 to 25 phr and more preferably still from 0 to 5 phr. Preferably again, the elastomer core of the composite cord according to this embodiment of the invention does not comprise a non-thermoplastic elastomer.

The diene elastomers can be diene elastomers as described above. It is also possible to use "essentially unsaturated" diene elastomers.

The term "essentially unsaturated" is understood to mean generally a diene elastomer resulting at least in part from conjugated diene monomers having a content of units of diene origin (conjugated dienes) which is greater than 15% (mol %). In the category of "essentially unsaturated" diene elastomers, "highly unsaturated" diene elastomer is understood to mean in particular a diene elastomer having a content of units of diene origin (conjugated dienes) which is greater than 50%.

Thus it is that diene elastomers, such as some butyl rubbers or copolymers of dienes and of α-olefins of EPDM type, can be described as "essentially saturated" diene elastomers (low or very low content of units of diene origin, always less than 15%).

Other Constituents

The composition of the elastomer core based on at least one thermoplastic elastomer can also comprise, as additional constituents, reinforcing fillers, plasticizers and various additives as described above.

Preparation

The TPE elastomers can be processed in the conventional way for TPEs, by extrusion or molding, for example using a starting material available in the form of balls or granules.

The elastomer core based on a thermoplastic elastomer of the composite cord according to one embodiment of the invention is prepared in the conventional way, for example by incorporation of the various components in a twin-screw extruder, so as to carry out the melting of the matrix and the incorporation of all the ingredients, followed by use of a die which makes it possible to produce the profiled element.

DESCRIPTION OF THE FIGURES

The appended figures illustrate a machine for producing a tread with incorporated regrooving cord and also such treads.

EXAMPLES OF THE IMPLEMENTATION OF THE INVENTION

Manufacture of the Composite Cord

Figure 1:
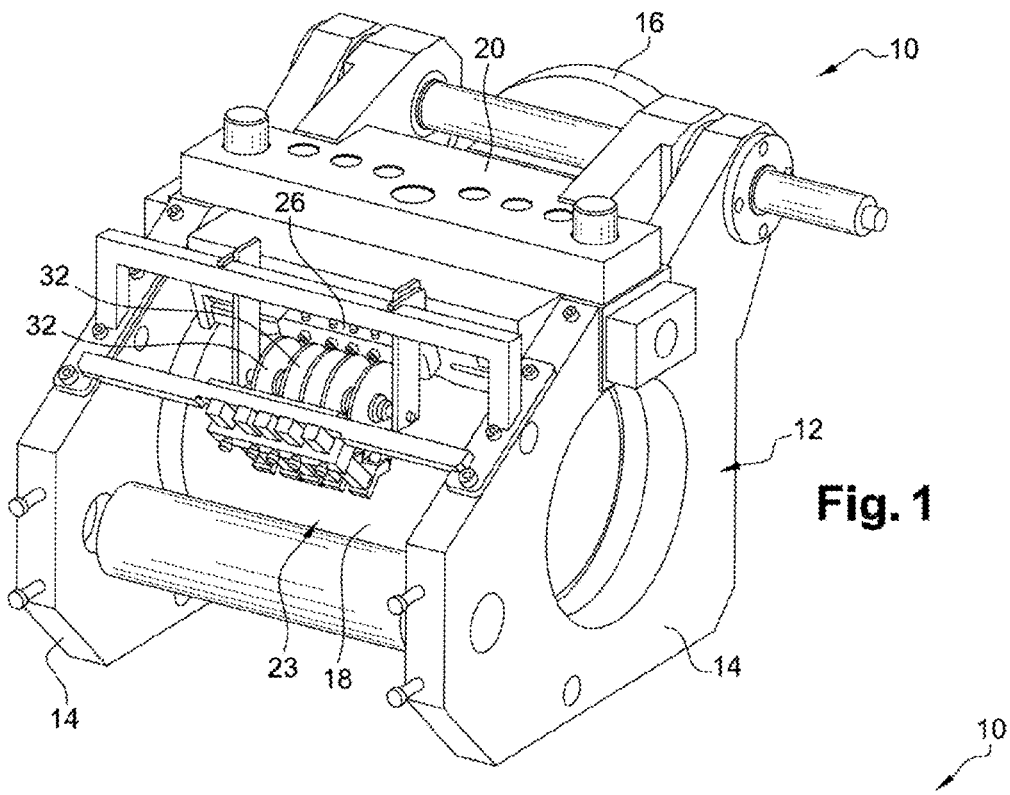
FIGS. 1 and 2 are two views, respectively in perspective and in vertical cross section, of a nose of a machine for producing a tread with regrooving cord.

The preparation of an elastomer core based on a TPE has already been described.

The composition of the elastomer core based on a diene elastomer is manufactured in appropriate mixers, using two successive phases of preparation well known to a person skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) down to a lower temperature, typically of less than 110° C., for example between 40° C. and 100° C., during which finishing phase the crosslinking system is incorporated.

The process for preparing a composition of such an elastomer core comprises, for example, at least the following stages:
  incorporating, in a diene elastomer, during a first stage ("non-productive" stage), the filler or fillers, everything being kneaded thermomechanically, in one or more goes, until a maximum temperature of between 110° C. and 190° C. is reached;
  cooling the combined mixture to a temperature of less than 100° C.;
  subsequently incorporating, during a second stage ("productive" stage), the crosslinking system;
  kneading everything up to a maximum temperature of less than 110° C.

By way of example, the non-productive phase is carried out in a single thermomechanical stage during which, in a first step, all the necessary base constituents (diene elastomer, fillers and coupling agent, if necessary, plasticizing system) are introduced into an appropriate mixer, such as a standard internal mixer, followed, in a second step, for example after kneading for one to two minutes, by the other additives, optional additional covering agents or processing aids, with the exception of the crosslinking system. The total duration of the kneading, in this non-productive phase, is preferably between 1 and 15 min.

After cooling the mixture thus obtained, the crosslinking system is then incorporated in an external mixer, such as an open mill, maintained at a low temperature (for example between 40° C. and 100° C.). The combined mixture is then mixed (productive phase) for a few minutes, for example between 2 and 15 min.

The crosslinking system is preferably a vulcanization system based on sulphur and on an accelerator. Use may be made of any compound capable of acting as accelerator of the vulcanization of diene elastomers in the presence of sulphur, in particular of those selected from the group consisting of 2-mercaptobenzothiazyl disulphide (abbreviated to "MBTS"), N-cyclohexyl-2-benzothiazolesulphenamide (abbreviated to "CBS"), N,N-dicyclohexyl-2-benzothiazolesulphenamide (abbreviated to "DCBS"), N-(tert-butyl)-2-benzothiazolesulphenamide (abbreviated to "TBBS"), N-(tert-butyl)-2-benzothiazolesulphenimide (abbreviated to "TBSI") and the mixtures of these compounds. Preferably, a primary accelerator of the sulphenamide type is used.

Additional to this vulcanization system may be various known secondary vulcanization accelerators or vulcanization activators, such as zinc oxide, stearic acid, guanidine derivatives (in particular diphenylguanidine), and the like, incorporated during the first non-productive phase and/or during the productive phase. The sulphur content is, for example, between 0.5 and 3.0 phr and that of the primary accelerator is between 0.5 and 5.0 phr.

The final composition of the elastomer core can subsequently be calendered, for example in the form of sheets or plaques. These intermediate products are subsequently extruded in one or more operations to give the final geometry of the core of the composite cord.

The elastomer cores are subsequently introduced into a sheath formed of a hollow cylindrical braid made of intertwined fibers in order to form a composite cord. The complete composite cords can then be wound around spools.

The composite cords can be used to be positioned in any tread internal cavity of pneumatic tires for a motor vehicle, such as a vehicle of two-wheel, passenger or industrial type.

Figure 16:
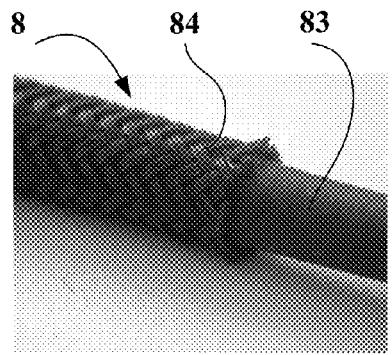
FIG. 16 illustrates an example of composite cord according to the invention.

FIG. 16 exhibits a view in perspective of a composite cord 8. This composite cord comprises a sheath 84 consisting of a braid formed of intertwined fibers 85 and an elastomer core 83. The sheath is interrupted in order to make it possible to display the core 83. The elastomer core has, in the example presented, a circular section.

Figure 17:
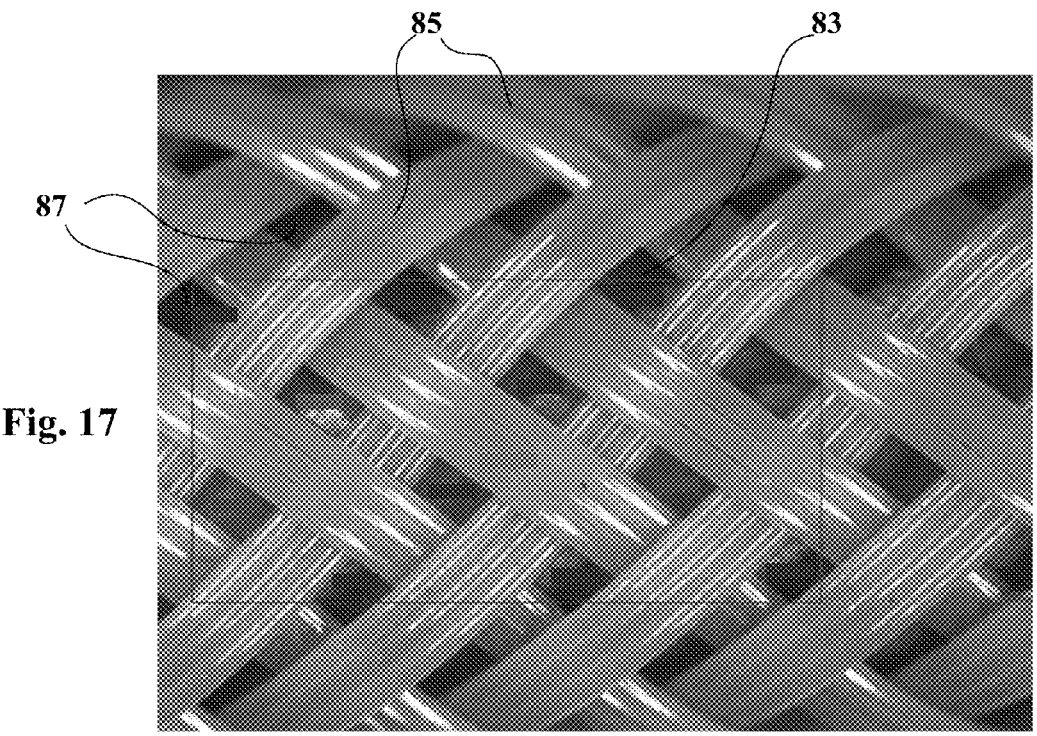
FIG. 17 is an enlargement of FIG. 16.

FIG. 17 is an enlargement of FIG. 16 which illustrates the intertwining of the fibers 85 consisting of thermoplastic material, such as polyamide 6,6. The fibers are polyamide monofilaments having flat sections which form, with one another, an intertwining which leaves empty spacings 87. The elastomer core 83 is made out through the spacings 87. This enlargement makes it possible to estimate the total surface area of the spacings relating to the surface area of the sheath. In the example presented, this ratio is of the order of 15%.

Manufacture of a Tread with Regrooving Composite Cord

According to one embodiment:
  a rubber tread is extruded;
  at least one furrow is formed in the tread;
  at least one composite cord is provided from a spool; and
  the composite cord is inserted into the or each furrow.

The composite cords or cords are produced as indicated above prior to the formation of the rubber tread and separately from the latter. It is then sufficient to position them in the furrow and to close the latter. The cords are thus buried in the rubber subsequent to the formation thereof. This process limits the amount of scrap from manufacturing failings due to the fact that it makes it possible to dispense with the stages of stabilization of the process at the start-up of each manufacturing series.

Preferably, for each section of the tread, the section is extruded and the furrow is formed in the section simultaneously.

A description will now be given, with reference to FIGS. 1 to 14, of an embodiment of a machine which is, in the case in point, an extrusion machine used for producing a tread for the manufacture of a vehicle pneumatic tire green blank.

Figure 15:
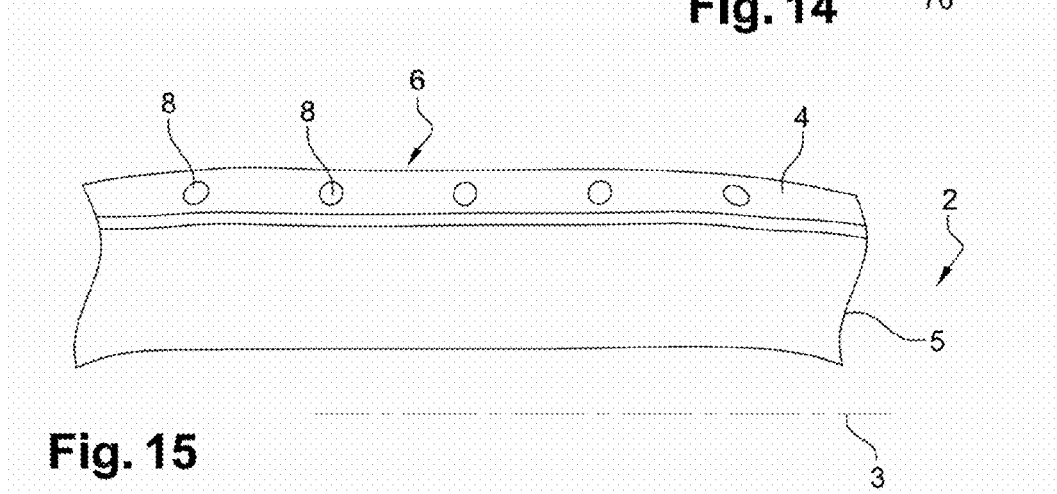
FIG. 15 is a view in cross section of the tread of the pneumatic tire manufactured by means of the machine.

An illustration has been given, in FIG. 15, of a portion of a cross section of a pneumatic tire resulting from this manufacturing operation after vulcanization of the blank, the cross section being taken in a radial plane with reference to an axis 3 of the pneumatic tire. The tread 4 extends in the periphery of the pneumatic tire between the sidewalls of the latter and over its carcass 5, in the periphery of the latter. The tread 4 exhibits an external peripheral face 6 forming the surface via which the pneumatic tire will be in contact with the ground. This face has a cylindrical general shape of circular cross section.

The tread 4 comprises a main body formed of rubber, which conventionally comprises a mixture of natural and synthetic elastomers and various products and adjuvants.

The tread 4 additionally comprises several cords or strings 8 which are, in the case in point, five in number, this number not being limiting. The cords each have a wire form, with a circular cross section, as is the case in FIGS. 7, 11 and 15, or a square cross section, as in the case of FIGS. 8 and 12.

The cords are embedded in the body and extend at a distance from the two main external and internal faces of the tread. Each cord forms a circle coaxial with the pneumatic tire and extends in a plane perpendicular to the axis 3. The cords can have identical or different transverse profiles and can be composed of identical or different materials. The cords are produced individually, beforehand and separately from the body, and are then wound onto spools 9 (see FIG. 2) which are subsequently brought to the machine.

The nose 10 of the extrusion machine comprises a frame 12 comprising two vertical uprights 14 of planar form positioned in parallel to one another and facing and at a distance from one another. The majority of the devices of the nose extend in the space provided between the two uprights 14.

Figure 2:
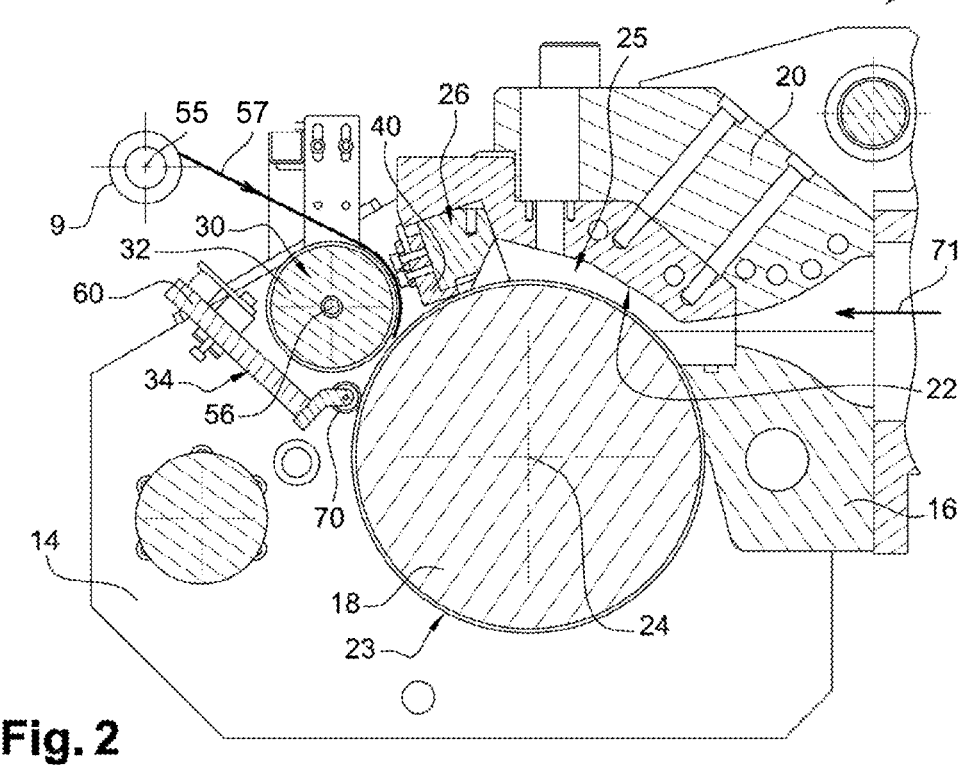

The nose comprises a conduit 16, illustrated in particular in the right-hand part of FIG. 2 and used to introduce the rubber intended to be extruded to form the body. The nose 10 comprises a cylinder or roll 18 positioned at the downstream mouth of the conduit 16 and exhibiting a cylindrical peripheral face 23 of circular section. The nose additionally comprises an assembly of parts 20 forming an arch 22 which delimits, with the face 23, a chamber 25 for pressurizing the material to be extruded, in which the conduit 16 emerges. The parts 20 are rigidly attached to the frame 12, whereas the roll 18 is fitted rotationally mobile, with respect to the uprights 14 around its horizontal axis 24, in the anticlockwise direction in FIG. 2. The nose 10 comprises a profiled blade 26 extending downstream from the chamber 25 and facing the face 23 of the roll. Downstream of the blade, the nose comprises an assembly 30 having small fitting wheels 32 used to introduce the cords into the furrows produced beforehand, and also a stitching assembly 34 used to close the furrows over the cords thus positioned.

Figure 3:
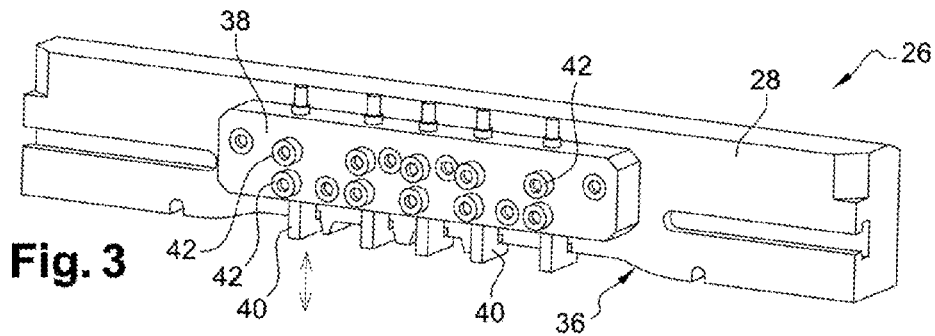
FIGS. 3 and 4 are two views, respectively in perspective and from the front, of the blade of the machine of FIG. 1.
Figure 4:
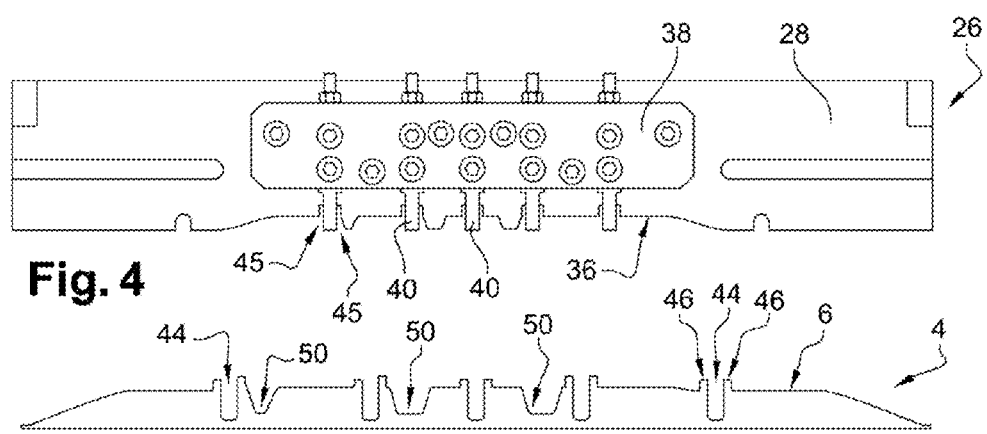
Figure 5:
FIG. 5 is a sectional view of the tread obtained by passing under the blade of FIG. 3.

With reference to FIGS. 3 and 4, the profiled blade 26 comprises a main body 28 of elongated shape from one to the other of the uprights 14 and rigidly attached to these. The body 28 has a lower face 36 exhibiting cavities and protrusions and intended to give its form to the upper face 6 of the tread by the effect of passing the rubber between this face 36 and the face 23 of the roll. These two elements thus form an extrusion orifice which confers its form on the section of the tread 4 during the passage of the material.

The blade 26 additionally comprises a support 38 carrying ploughshares 40, the number of which equals that of the cords 8 which the tread is intended to receive, in the case in point five. As illustrated in particular in FIG. 2, each of the ploughshares 40 exhibits an "L" general shape, the longer part of the "L" extending in a direction close to the vertical direction and close to the direction radial to the axis 24, and being inserted into a dedicated orifice of the support 38 in which it is fitted so as to be able to move by sliding along this direction.

The blade 26 comprises, for each ploughshare 40, means for rigidly attaching to the body 28, which means are formed, in the case in point, for each ploughshare by two attachment screws 42 which pass through a part of the support and tighten the ploughshare against an internal face of the support. This arrangement makes it possible to adjust the position of the ploughshare with respect to the body 28 along the abovementioned direction and thus to adjust the depth of the furrow 44 produced by the corresponding ploughshare in the tread 4, for example depending on the model of pneumatic tire being manufactured.

The furrows 44 themselves are generated by the penetration of the base or small side of the "L" of each ploughshare 40 into the extruded material forming the rubber tread. The furrows are generated by the fact that the base of each ploughshare projects from the face 36 of the body 28 or more specifically from certain regions of this face, as illustrated in FIG. 4. The small side of the "L" is oriented so that the ploughshare penetrates under the profiled part of the extrusion blade. This particular setup makes it possible to position the upstream part of the ploughshare in a region where the pressure within the tread is not yet zero, which makes it possible to facilitate the penetration of the ploughshare into the material of the tread and the quality of the molding.

The face 36 exhibits at right angles with each ploughshare a cavity 45 extending beyond the ploughshare on each side of the latter. Each of these cavities makes it possible to form, on either side of the furrow, respective protruding beads 46 forming surpluses of rubber projecting from the main part of the face 6. Each furrow thus extends between the two associated beads 46 which are contiguous with it.

As the number of furrows is equal to five in the case in point, ten beads are present. The furrows 44 are intended to receive the cords and then to be filled in, as will be seen later. The face 36 is also configured in order to form furrows 50, in the case in point three in number, intended to visibly persist on the tread and on the final pneumatic tire, in contrast to the furrows 44. All the abovementioned furrows extend parallel to one another and in the longitudinal direction of the tread 4.

Figure 6:
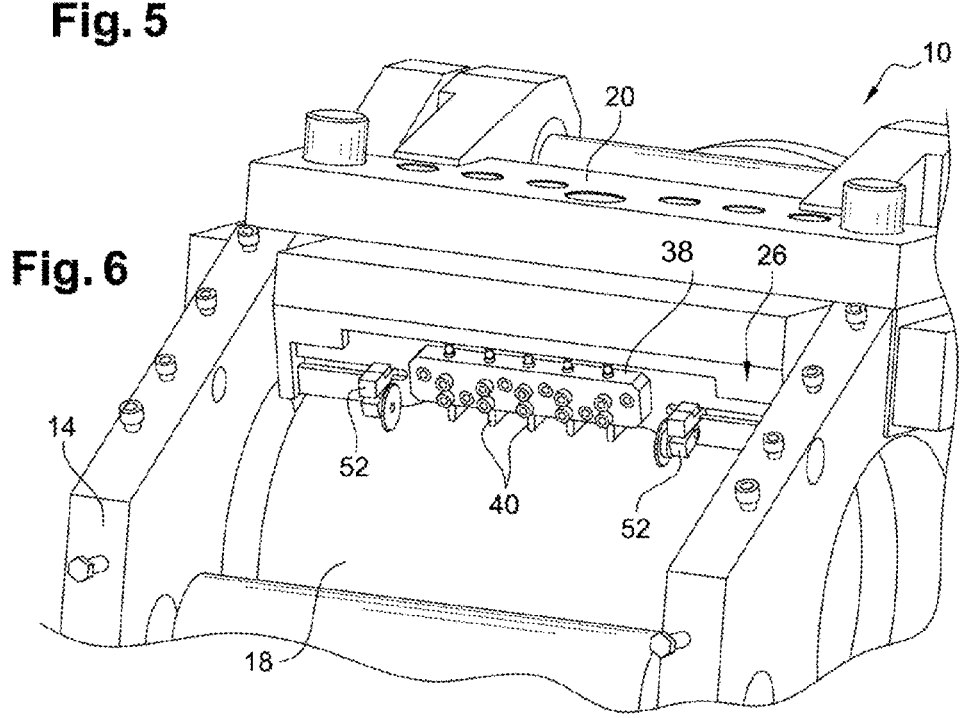
FIG. 6 is a view analogous to FIG. 1 showing the positioning of the blade of FIG. 3 on the machine.

As illustrated in FIG. 6, the blade 26 additionally carries, in the case in point, two devices 52 forming knives for debarring the material in order to delimit the two opposite side edges of the tread. These devices are positioned facing one another, on either side of the support 38.

The extrusion machine comprises means 55 for receiving spools 9 on which the respective cords are wound. These means are arranged so as to allow the spools to unwind as the manufacturing operation proceeds.

The assembly 30 (see FIGS. 6, 9 and 10) comprises wheels 32 which are equal in number, in the case in point, to that of the cords, namely five in number. The wheels are identical to one another and are mounted coaxially to one another around a horizontal axis 56. They extend facing the blade 26 so that a path 57 of the cords coming from the spools 9 passes between the assembly 30 and the blade 26 before they are inserted in the tread. During this path, the cords are supported against the circumferential peripheral edge of the respective wheels 32. Each wheel thus acts to guide the corresponding cord as far as the bottom of the furrow in order to deposit it therein, the wheel for this purpose penetrating inside the corresponding furrow.

The wheels 32 are mounted on a common gantry attached to the frame, the vertical position of which is adjustable in order to cause the wheels to penetrate more or less deeply into the furrows and thus to insert the corresponding cords more or less into the latter. In the case in point, no motorized drive is provided for the wheels 32, the latter being driven in rotation by the forward progression of the tread and the cords inserted into this tread at the same peripheral speed as the latter. It is possible to provide an intermediate guiding part, such as a tube, traversed along its axis by the cords in order to guide them from the spools 9 as far as the assembly 30.

Figure 7:
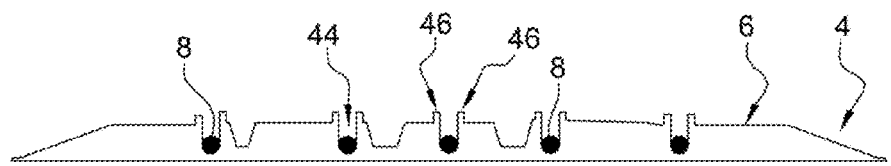
FIGS. 7 and 8 are two views analogous to FIG. 5 showing the cords introduced into the furrows on two treads of different pneumatic tires.
Figure 8:
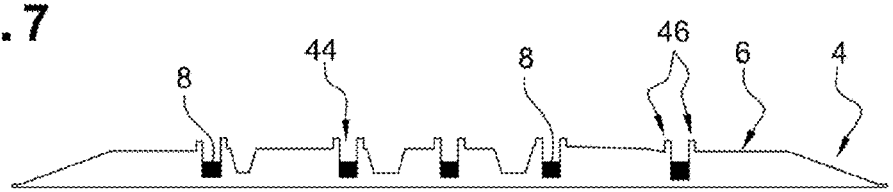
Figure 9:
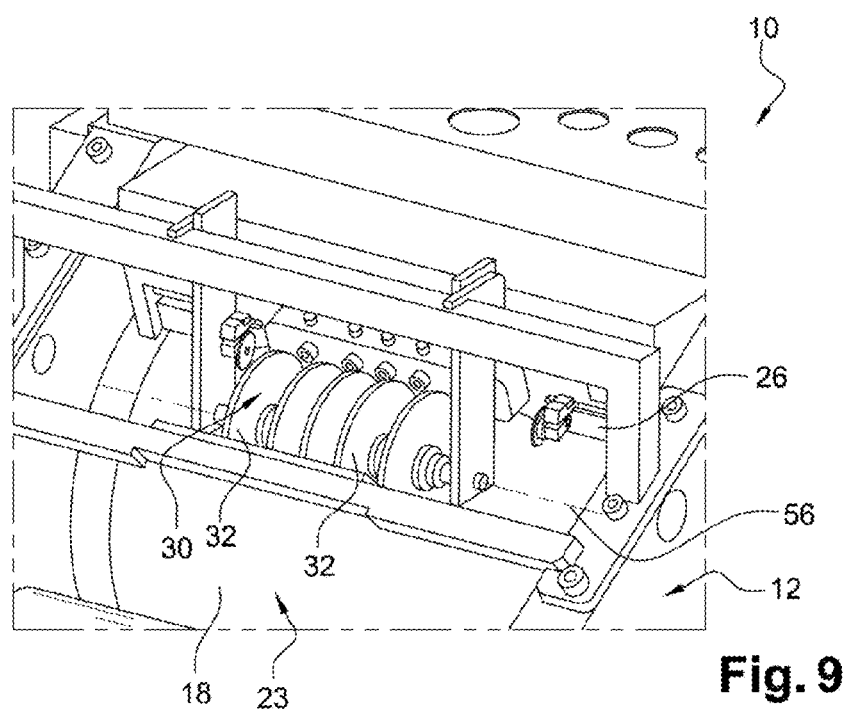
FIG. 9 is a view analogous to FIG. 6 showing the devices for guiding the cords into the furrows on the machine.
Figure 10:
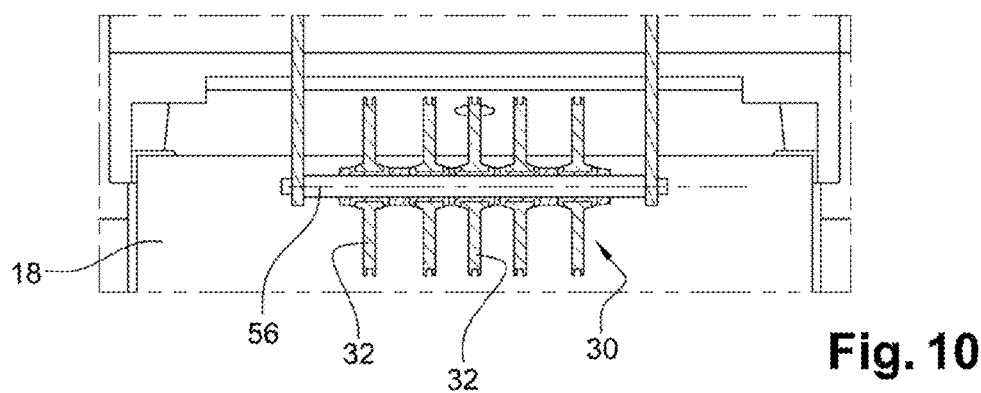
FIG. 10 is a front view of the part of the machine illustrated in FIG. 9.

FIG. 7 illustrates the tread 4 with its open furrows 44, at the bottom of which the composite cords 8 have been deposited. This figure concerns cords having a circular cross section with a diameter of approximately 4 millimeters. FIG. 8 analogously illustrates the case of a tread 4, in the furrows 44 of which are positioned composite cords 8 exhibiting a cross section of parallelepipedal shape, for example square shape with a side length of 4 millimeters.

With reference to FIGS. 2 and 11 to 14, the stitching assembly 34 comprises stitching devices, the number of which is equal to that of the cords, namely five in the case in point. One of these devices 60 has been illustrated in FIG. 14. The assembly 34 comprises a support 62 rigidly attached to the uprights 14 and extending from one to the other of these. Each of the devices 60 comprises a strut 64 of profiled form, received in a corresponding female orifice of the support 62 while being able to move by sliding in the latter along its longitudinal direction, which is similar to the direction radial to the axis 24. The assembly 34 comprises, for each device, a tightening element 66 which passes through the wall of the support 62 in order to tighten the strut 64 against an internal face of the support and thus to rigidly immobilize the device 60 with respect to the support 62 in the chosen position of adjustment.

Figure 11:
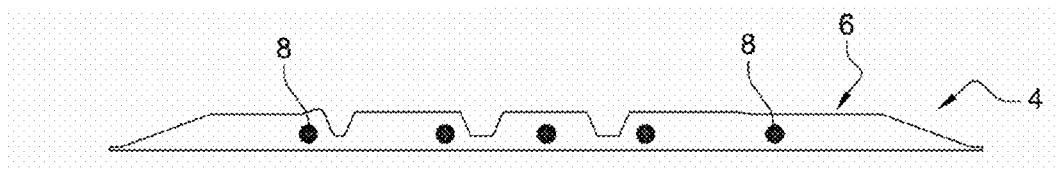
FIGS. 11 and 12 are views analogous to FIGS. 7 and 8 showing the section of the tread when the furrows are closed.
Figure 12:
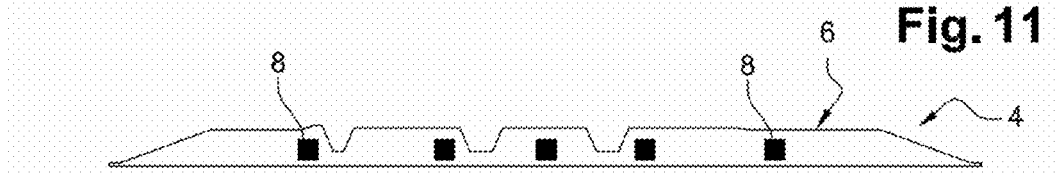
Figure 13:
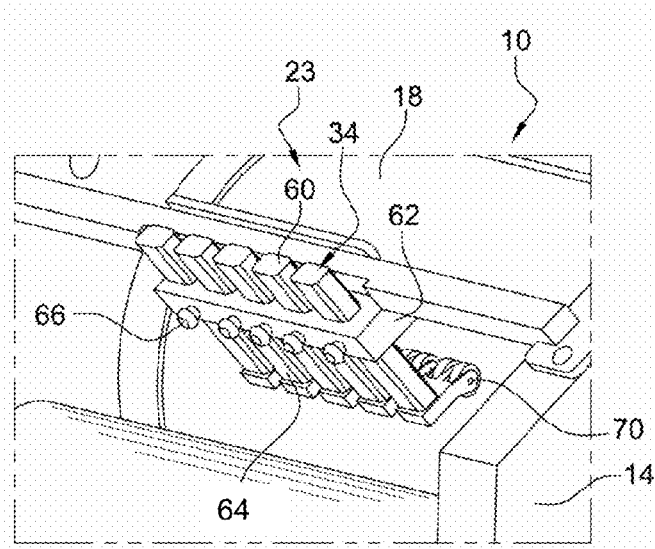
FIG. 13 is a view analogous to FIG. 9 showing the filling devices of the machine of FIG. 1.
Figure 14:
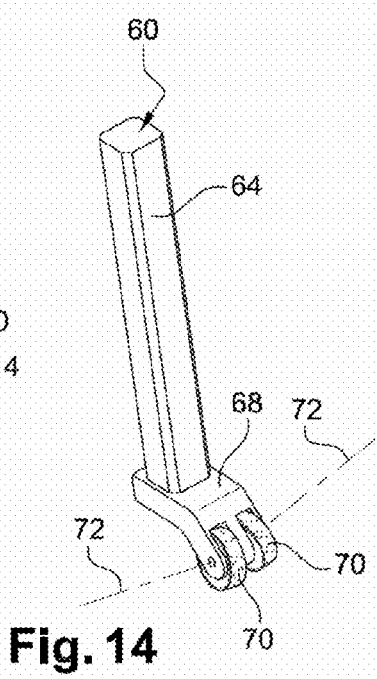
FIG. 14 is a view in perspective of one of these devices.

Each device 60 comprises, at a lower end of the strut, an arm 68 carrying two small toothed wheels 70 mounted in rotating fashion on the arm via respective axes of rotation 72 which are coplanar but intersecting and arranged so that the small wheels have an open configuration towards the upstream side with reference to the direction of forward progression of the tread. The small wheels are positioned so as to be supported against the respective beads 46 associated with the furrow under consideration, so as to turn down the material forming these protrusions into the furrow over the cord 8 for the purpose of filling the furrow 44. The cord is thus buried, covered and embedded in the tread, as illustrated in FIGS. 11 and 12 in the two cases corresponding to the respective FIGS. 7 and 8.

The process for the manufacture of the tread is carried out in the following way by means of this machine. The material forming the rubber is brought into the nose via the conduit 16 according to the arrow 71 and then passes into the chamber 25, where it is pressurized before being extruded through the extrusion orifice formed by the blade 26 and the roll 18. During this operation, which in particular gives the form to the upper face 6 of the tread, the ploughshares 40 produce longitudinal furrows 44 in the face 6 and also two beads 46 situated on either side of each furrow. The ploughshares are present in a rear part in a region of the machine where the pressure is reduced with respect to the pressure prevailing in the chamber 25.

The spools 9 carrying the cords unwind and the cords, guided and supported by the small wheels 32, pass between these and the blade 26 in order to be inserted at the bottom of the respective furrows 44 in the thickness of the tread. The cords unwind from the spools under the effect of the tread being driven along, which also drives the wheels 32. The spool is not slowed down by any actuator during its movement.

The material forming the tread is still hot and soft at this stage. When the tread passes under the stitching assembly 34, the wheels 70 turn down the material of the beads 46 into the corresponding furrow, thus embedding the associated cord in the thickness of the tread. The furrow is thus blocked and filled.

These operations take place successively for each section of tread under consideration. They take place at the same time for the whole of the tread, the treads being manufactured continuously.

Figure 18:
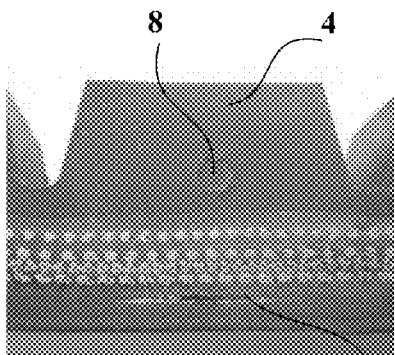
FIG. 18 exhibits a partial section of a pneumatic tire, the tread of which comprises a composite cord according to the invention.

FIG. 18 exhibits a partial section of a pneumatic tire in which a composite cord 8 as described above in FIGS. 16 and 17 has been incorporated in a rib of the tread 4.

Figure 19:
FIG. 19 shows the section of FIG. 18 after partial stripping of the composite cord according to the invention.

FIG. 19 illustrates the section after partial stripping, that is to say a partial extraction carried out with a knife, of the composite cord 8 of the tread 4. The existence of "rubber bridges" 86 passing through the spacings 87 of the sheath 84 is observed. These rubber bridges make it possible to produce an excellent mechanical bond between the composite cord and the adjacent mixture of the tread. They are produced in particular by interdiffusion and covulcanization of the materials of the elastomer core and of the tread. There is no adhesive bonding between the fibers 85 and the material of the tread; it is this which makes it possible to extract the composite cord from the tread after partial wear of the latter.

Tests

Composite cords were produced and incorporated in treads of pneumatic tires as described above. The formulation of the elastomer core is given in Table 1. The amounts are expressed as parts per 100 parts by weight of elastomer (phr).

TABLE 1

|  | Core |
| --- | --- |
| NR (1) | 100 |
| Filler A (2) | 50 |
| Coupling agent (3) | 5 |
| Antioxidant (4) | 2 |
| Stearic acid | 2.5 |
| Zinc oxide (5) | 2.7 |
| Accelerator (6) | 1.8 |
| Sulphur | 1.8 |

(1) Natural rubber;
(2) Filler A: Zeosil 1165MP silica from Rhodia, HD type;
(3) Coupling agent: TESPT (Si69 from Degussa);
(4) N-(1,3-Dimethylbutyl)-N-phenyl-para-phenylenediamine (Santoflex 6-PPD from Flexsys);
(5) Zinc oxide (industrial grade, Umicore);
(6) N-(Cyclohexyl)-2-benzothiazolesulphenamide (Santocure CBS from Flexsys).

The braid used is the Gremflex® PA6.6 braid from Gremco, of size 10. This braid exhibits a variable diameter between 7 and 12 mm. This makes it possible to easily incorporate an elastomer cord core and then, by axial tension along the generatrix of the braid, to come and apply the braid against the periphery of the cord core.

Results

Pneumatic tires for a heavy duty vehicle of 315/70 R 22.5 size were produced comprising, in circumferential cavities of their tread, cylindrical cords with a similar geometry to the cord 8 of FIG. 16 having a diameter of the order of 6 mm, corresponding to the composition presented above and to the sheath presented above. The cavities were formed in the tread and the cords were introduced into these cavities in the raw form according to the process described above. The cords were positioned at the same level of the tread as the regions intended to be regrooved in the normal fashion.

These pneumatic tires were first of all subjected, for 2000 km, to a test on a stressing rolling drum for the tread, where high-load and high-drift rolling operations are alternated with straight-line high-load rolling operations. The tires and their treads resisted well.

The treads of the pneumatic tires were subsequently planed down, that is to say that the tread was machined in order to reduce its thickness until the sheaths of the regrooving cords are revealed. The pneumatic tires were subsequently subjected to behavioural tests on tracks in the dry state and on tracks covered with a thickness of water.

These tests consisted of running operations of a few tens of km at a normal speed of 90 km/h and then at a limiting speed of 125 km/h on a circuit in the dry state. Subsequently, the pneumatic tires were tested on a circuit comprising numerous bends and covered with water in order to confirm whether the water does not detrimentally affect the hold of the cord in the cavity.

During all these tests, the composite cords according to the invention remained in place in their cavities. Their anchoring was sufficient to prevent any relative movement between the cords and the adjacent material of the tread before and after planing down the treads. The cords were subsequently able to be removed manually without specific tooling and all at once. The grooves thus created in the tread were suitable.

The regrooving cords according to the invention thus have the advantage of making possible good control of their geometry before and after the preparation of the pneumatic tire, of restoring a suitable appearance of the pattern after they have been extracted and of having great ease of industrial implementation.

The invention claimed is:

1. A pneumatic or non-pneumatic tire comprising a tread, wherein the tread includes, in at least one internal cavity, a regrooving element formed of a composite cord, wherein the regrooving element includes an elastomer core and a sheath surrounding the elastomer core, and wherein the sheath is a hollow cylindrical braid made of first and second sets of fibers that are helically intertwined with each other,
wherein adjacent fibers of the first set are arranged in a generally parallel and non-touching manner, adjacent fibers of the second set are arranged in a generally parallel and non-touching manner, and the fibers of the first set are crisscrossed with the fibers of the second set, and
wherein elastomer bridges mechanically connect the elastomer core to the tread through openings in the braid.

2. The tire according to claim 1, wherein the intertwined and non-contiguous fibers define, between them, spacings having a relative surface area of between 5% and 30%.

3. The tire according to claim 2, wherein the relative surface area of the spacings is between 10% and 20%.

4. The tire according to claim 1, wherein the fibers of the braid are selected from a group consisting of: polyamides, polyesters, polysulphones, poly(phenylene sulphide)s, poly(ether-ketone)s, polyetherimides, poly(amide-imide)s, polyimides, thermoplastic elastomers, mixtures thereof, and alloys thereof.

5. The tire according to claim 4, wherein the fibers of the braid include polyamides selected from a group of aliphatic polyamides that includes: polyamides 6, polyamides 6,6, and mixtures thereof.

6. The tire according to claim 4, wherein the fibers of the braid include polyamides selected from a group of semi-aromatic polyamides that includes: poly(meta-xylylene adipamide)s (MXD 6), polyphthalamides, copolyamides thereof, and mixtures thereof.

7. The tire according to claim 4, wherein the fibers of the braid include polyesters selected from a group that includes: polyethylene terephthalates (PETs), polybutylene terephthalates (PBTs), polycarbonates (PCs), polyethylene naphthalates (PENs), and mixtures thereof.

8. The tire according to claim 4, wherein the fibers of the braid include thermoplastic elastomers selected from a group that includes: poly(ether-block-amide)s, thermoplastic polyurethanes, ether-ester copolymers (COPEs), and mixtures thereof.

9. The tire according to claim 4, wherein the fibers of the braid include ether-ester copolymers (COPEs) selected from a group that includes: polyester-ethers and polyester-esters.

10. The tire according to claim 1, wherein a composition of the elastomer core includes at least one diene elastomer.

11. The tire according to claim 10, wherein the at least one diene elastomer is selected from a group of elastomers consisting of: polybutadienes, natural rubber, synthetic polyisoprenes, butadiene copolymers, isoprene copolymers, and mixtures thereof.

12. The tire according to claim 10,
wherein a composition of the elastomer core includes more than 30 phr (parts by weight per hundred parts of elastomer) of a filler A, and
wherein the filler A includes nanoparticles having a weight-average size of less than 500 nm.

13. The tire according to claim 12, wherein the filler A includes carbon black.

14. The tire according to claim 12, wherein the filler A includes an inorganic filler.

15. The tire according to claim 14, where the inorganic filler is silica.

16. The tire according claim 1,
wherein the elastomer core includes at least one thermoplastic elastomer, and
wherein the at least one thermoplastic elastomer is a block copolymer that includes at least one unsaturated elastomer block and at least one thermoplastic block.

17. The tire according to claim 16, wherein the at least one unsaturated elastomer block is selected from elastomers having a glass transition temperature of less than 25° C.

18. The tire according to claim 16, wherein the at least one unsaturated elastomer block includes a diene elastomer resulting from isoprene, butadiene, or a mixture thereof.

19. The tire according to claim 16,
wherein the at least one thermoplastic block is selected from polymers having a glass transition temperature of greater than 80° C., and
wherein, if the at least one thermoplastic block includes a semi-crystalline thermoplastic block, the at least one thermoplastic block has a melting point of greater than 80° C.

20. The tire according to claim 16, wherein the at least one thermoplastic block is selected from a group consisting of: polyolefins, polyurethanes, polyamides, polyesters, polyacetals, polyethers, polyphenylene sulphides, polyfluorinated compounds, polystyrenes, polycarbonates, polysulphones, polymethyl methacrylate, polyetherimide, thermoplastic copolymers, and mixtures thereof.

21. The tire according to claim 16, wherein the at least one thermoplastic block is selected from polystyrenes.

22. The tire according to claim 16, wherein the at least one thermoplastic elastomer is selected from a group of copolymers consisting of: styrene/butadiene (SB) thermoplastic elastomers, styrene/isoprene (SI) thermoplastic elastomers, styrene/butadiene/isoprene (SBI) thermoplastic elastomers, styrene/butadiene/styrene (SBS) thermoplastic elastomers, styrene/isoprene/styrene (SIS) thermoplastic elastomers, styrene/butadiene/isoprene/styrene (SBIS) thermoplastic elastomers, and mixtures thereof.

23. The tire according to claim 16, wherein the elastomer core includes only the at least one thermoplastic elastomer as an elastomer thereof.

24. The tire according to claim 16, wherein the elastomer core further includes one or more non-thermoplastic elastomers at a total content of at most less than 50 phr (parts by weight per hundred parts of elastomer).

25. The tire according to claim 24, wherein the elastomer core further includes one or more non-thermoplastic elastomers at a total content of at most less than 30 phr (parts by weight per hundred parts of elastomer).

26. The tire according to claim 1, wherein a greatest dimension of the composite cord in any cross section is between 3 and 20 mm.

27. The tire according to claim 26, wherein the greatest dimension of the composite cord in any cross section is between 5 and 15 mm.

28. The tire according to claim 1, wherein the first and second sets of fibers are not adhesively bonded to the tread.

* * * * *

UNITED STATES PATENT AND TRADEMARK OFFICE
CERTIFICATE OF CORRECTION

PATENT NO. : 9,487,892 B2
APPLICATION NO. : 14/118298
DATED : November 8, 2016
INVENTOR(S) : Vincent Abad It is certified that error appears in the above-identified patent and that said Letters Patent is hereby corrected as shown below:

In the Specification

Column 5:
Line 11, "$(d_w=\Sigma(n_i \times d_i^5/\Sigma(n_i \times d_i^4))$" should read --$(d_w=\Sigma(n_i \times d_i^5)/\Sigma(n_i \times d_i^4))$--; and
Line 41, a new paragraph should start with the sentence that begins "The braid.".

Column 7:
Line 6, "to" should be deleted.

Column 11:
Line 50, "30 000 and 500 000" should read --30,000 and 500,000--;
Line 51, "40 000 and 400 000" should read --40,000 and 400,000--; and
Lines 61-62, "50 000 to 300 000" should read --50,000 to 300,000--.

Column 12:
Line 48, "15 000" should read --15,000--.

Column 14:
Lines 39-40, "25 000 g/mol to 350 000 g/mol" should read --25,000 g/mol to 350,000 g/mol--; and
Line 40, "35 000 g/mol to 250 000 g/mol" should read --35,000 g/mol to 250,000 g/mol--.

Column 16:
Line 43, "5 000" should read --5,000--; and
Line 44, "150 000" should read --150,000--.

Column 20:
Line 19, "made out" should read --visible--; and
Line 32, "the or" should be deleted.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,487,892 B2

Column 22:
Line 30, "debarring" should read --deburring--.